(12) United States Patent
Yan et al.

(10) Patent No.: US 12,352,643 B2
(45) Date of Patent: Jul. 8, 2025

(54) TRAFFIC MONITORING USING OPTICAL SENSORS

(71) Applicant: PALO ALTO RESEARCH CENTER INCORPORATED, Palo Alto, CA (US)

(72) Inventors: Jin Yan, Palo Alto, CA (US); Qiushu Chen, San Jose, CA (US); Ajay Raghavan, Mountain View, CA (US); Peter Kiesel, Palo Alto, CA (US); Jingxiao Liu, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 365 days.

(21) Appl. No.: 17/873,503

(22) Filed: Jul. 26, 2022

(65) Prior Publication Data

US 2023/0039656 A1 Feb. 9, 2023

Related U.S. Application Data

(63) Continuation-in-part of application No. 17/393,986, filed on Aug. 4, 2021, now Pat. No. 11,823,567.

(51) Int. Cl.
*G08G 1/015* (2006.01)
*G01L 1/24* (2006.01)
*G08G 1/01* (2006.01)

(52) U.S. Cl.
CPC .......... *G01L 1/243* (2013.01); *G08G 1/0125* (2013.01); *G08G 1/015* (2013.01)

(58) Field of Classification Search
CPC ..................................................... G08G 1/0116
(Continued)

(56) References Cited

U.S. PATENT DOCUMENTS 4,554,724 A 11/1985 Bantz
6,807,355 B2 10/2004 Dofher
(Continued)

FOREIGN PATENT DOCUMENTS

CN 111521248 A 8/2020
WO WO 02/065182 A2 2/2005
WO WO 2018/222541 A1 12/2018

OTHER PUBLICATIONS

European Patent Application No. 22185969.7; Office Action issued Dec. 21, 2022, 9 pages.
(Continued)

*Primary Examiner* — Qutbuddin Ghulamali
(74) *Attorney, Agent, or Firm* — Mueting Raasch Group

(57) ABSTRACT

A sensor network comprises at least one lateral optical fiber and at least one longitudinal optical fiber. The lateral fiber comprises optical sensors coupled to a pavement in a transverse orientation relative to a direction of vehicle travel along the pavement. The longitudinal fiber comprises optical sensors coupled to the pavement in a longitudinal orientation relative to the direction of vehicle travel. The optical sensors are configured to produce wavelength shift signals comprising one or more lateral strain signals associated with the lateral fiber and one or more tangential strain signals associated with the longitudinal fiber. A processor is operatively coupled to the sensor network and configured to determine a weight of vehicles moving along the pavement based on the lateral and tangential strain signals. A transmitter is operatively coupled to the processor and configured to transmit the weight of vehicles to a predetermined location.

22 Claims, 41 Drawing Sheets

(58) Field of Classification Search
USPC .................................................. 340/935
See application file for complete search history.

(56) References Cited

U.S. PATENT DOCUMENTS

| | | | |
|---|---|---|---|
| 7,095,930 B2 | 8/2006 | Storaasil et al. | |
| 8,990,032 B2 | 3/2015 | Bajwa et al. | |
| 9,062,423 B2 | 6/2015 | Allouche et al. | |
| 9,208,681 B2 | 12/2015 | Borton et al. | |
| 9,353,887 B2 | 5/2016 | Konczak | |
| 10,697,804 B2 | 6/2020 | Freeland et al. | |
| 11,138,873 B1* | 10/2021 | Clifford | G08G 1/04 |
| 11,466,428 B1 | 10/2022 | Pino | |
| 2002/0061231 A1 | 5/2002 | Finzel et al. | |
| 2002/0140924 A1 | 10/2002 | Wangler et al. | |
| 2003/0127587 A1* | 7/2003 | Udd | G01L 1/246 |
| | | | 250/227.14 |
| 2004/0067004 A1 | 4/2004 | Hill et al. | |
| 2004/0115004 A1 | 6/2004 | Serrano | |
| 2004/0165957 A1 | 8/2004 | Serrano et al. | |
| 2009/0219172 A1* | 9/2009 | Wilbrod | G08G 1/04 |
| | | | 340/937 |
| 2010/0303404 A1 | 12/2010 | Fischer | |
| 2013/0011198 A1 | 1/2013 | Pichler et al. | |
| 2013/0220708 A1* | 8/2013 | Kim | G01G 23/3735 |
| | | | 177/3 |
| 2013/0223807 A1 | 8/2013 | Elford et al. | |
| 2014/0159925 A1* | 6/2014 | Mimeault | G01S 7/484 |
| | | | 340/935 |
| 2014/0277897 A1 | 9/2014 | Saiz | |
| 2015/0356871 A1* | 12/2015 | Kugel | G01C 21/3697 |
| | | | 340/935 |
| 2019/0137305 A1* | 5/2019 | Karabacak | G01D 5/353 |
| 2019/0206240 A1* | 7/2019 | Gonçalves | G08G 1/04 |
| 2019/0317293 A1 | 10/2019 | Cox et al. | |
| 2020/0166390 A1 | 5/2020 | Ainger et al. | |

OTHER PUBLICATIONS

European Patent Application No. 22186447.3; Office Action issued Dec. 22, 2022, 10 pages.

Fajkus et al., "PDMS-FBG-Based Fiber Optic System for Traffic Monitoring in Urban Areas," Jul. 3, 2020, *IEEE Access*, 8: 127648-127658.

* cited by examiner

FROM FIG. 12A    TO FIG. 12D

Lateral strain under wheels

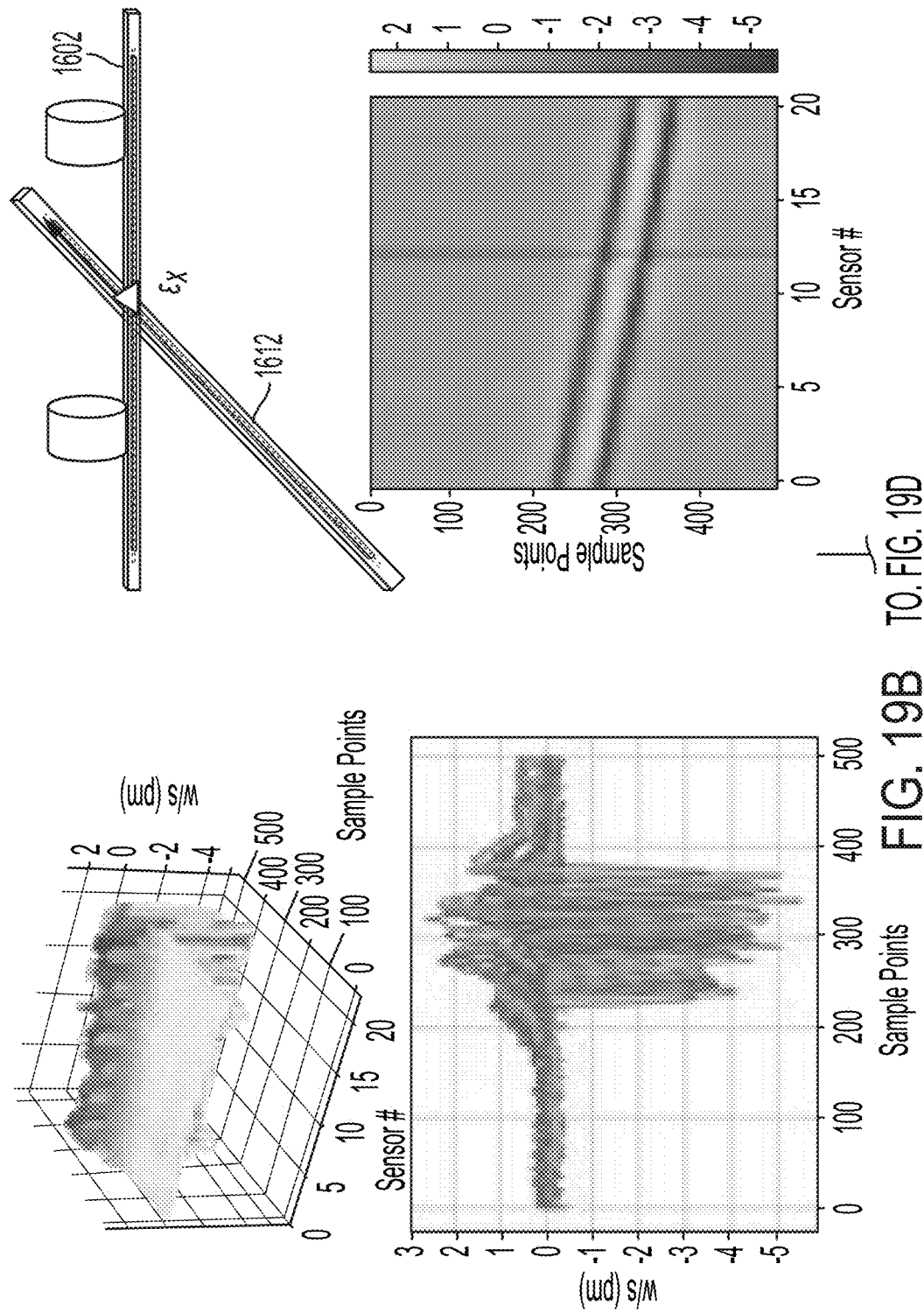

TO FIG. 19D

TRAFFIC MONITORING USING OPTICAL SENSORS

RELATED PATENT DOCUMENTS

This application is a continuation-in-part of U.S. application Ser. No. 17/393,986 filed on Aug. 4, 2021, which is incorporated herein by reference in its entirety.

TECHNICAL FIELD

This application relates generally to techniques for traffic monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be installed on and/or under pavement, for example, and operated to detect parameters, e.g., strain, temperature, vibration, related to vehicles traveling on the road.

SUMMARY

Embodiments are directed to a sensor network comprising at least one lateral fiber and at least one longitudinal fiber. The lateral fiber comprises optical sensors coupled to a pavement in a transverse orientation relative to a direction of vehicle travel along the pavement. The longitudinal fiber comprises optical sensors coupled to the pavement in a longitudinal orientation relative to the direction of vehicle travel. The optical sensors are configured to produce wavelength shift signals comprising one or more lateral strain signals associated with the lateral fiber and one or more tangential strain signals associated with the longitudinal fiber. A processor is operatively coupled to the sensor network and configured to determine a weight of vehicles moving along the pavement based on the lateral and tangential strain signals. A transmitter is operatively coupled to the processor and configured to transmit the weight of vehicles to a predetermined location.

Embodiments are directed to a method comprising receiving one or more lateral strain signals in the form of first wavelength shift signals from at least one lateral fiber comprising optical sensors coupled to a pavement in a transverse orientation relative to a direction of vehicle travel along the pavement. The method also comprises receiving one or more longitudinal strain signals in the form of second wavelength shift signals from at least one longitudinal fiber comprising optical sensors coupled to the pavement in a longitudinal orientation relative to a direction of vehicle travel. The method further comprises determining a weight of vehicles moving along the pavement based on the lateral and tangential strain signals. The method also comprises transmitting the weight of vehicles to a predetermined location.

BRIEF DESCRIPTION OF THE DRAWINGS

Throughout the specification reference is made to the appended drawings wherein:

FIGS. 19A-19C illustrate tangential strain signals resulting from the wheel locations relative to sensors of a longitudinal fiber in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
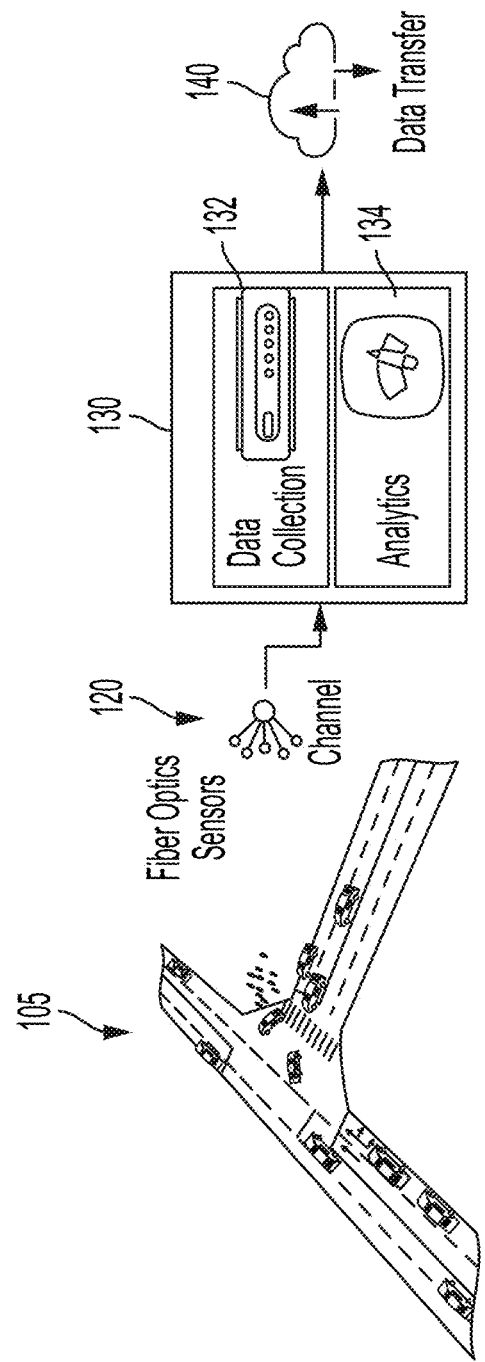
FIG. 1A illustrates a diagram of an FO traffic monitoring system in accordance with embodiments described herein.

Embodiments described herein may involve a traffic monitoring system that is capable of extracting traffic parameters, including characteristics of vehicles and their movement on the road. Extracting these traffic parameters may allow for better traffic management and pavement maintenance/design, which will help to mitigate traffic congestion problems, prevent catastrophic failure due to poor road conditions, and/or improve the life quality of citizens.

Embodiments described herein a system for accurate monitoring of traffic and/or identifying vehicles that can be used in an intelligent traffic management and planning system. Embodiments herein describe a system and methods for integrated traffic monitoring (e.g., traffic volume, speed, and/or road occupancy) and vehicle attributes extraction (e.g., number of axles, axle groups, vehicle type, an/or axle weight) using distributed fiber optics (FO) sensors embedded in pavement.

Embodiments described herein may include one or more of 1) being capable of monitoring multiple parameters, 2) being highly accurate, 3) being robust under various field and/or weather conditions, 4) having a low installation and/or maintenance cost, and 5) having a low down time. Embodiments herein may involve hardware of a traffic monitoring system based on optical sensors. According to various configurations, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used.

The sensors described herein are generally described as fibers inscribed with FBG arrays as the sensing element for traffic monitoring. FBGs are wavelength-specific narrowband reflectors formed in the core of standard fibers by introducing a periodic variation in the refractive index (RI) of the fiber core. Several factors, including temperature and strain, that change the RI variation will shift the reflection wavelength of an FBG and thus be sensed by the FBG. While many embodiments described herein use FBGs as an example, it is to be understood that any suitable types of sensors may be used. Detailed considerations for FBG array design for the specific use case are discussed. The proposed fiber optic (FO)-based sensing system has several unique characteristics. For example, the sensing system may be substantially immune to electro-magnetic interference. The allows for less frequent system maintenance and/or calibration, which may be useful for reliable long-term deployment in the field. The proposed system may be independent of visibility condition at the site. The proposed system may be capable of self-calibration of temperature.

The proposed scheme may be capable of monitoring multiple parameters, including one or more of weigh-in-motion, speed, axle count, and vehicle class with high accuracy and high dynamic range. The proposed scheme can provide higher spatial resolution of vehicles on the lane, being able to detect a lane-changing event and/or a lane straddling event.

Various embodiments show installation strategies to incorporate fibers substantially permanently into the pavement. Though this is invasive installation with introduction of certain amount of material into the pavement, the proposed FBG-based FO sensing system is supposed to facilitate standardized installation procedure, have potential for high level of multiplexing, have a longer lifetime, and be compatible with the mature mass production of FBG FO sensors, which makes this invention more competent and cost-effective for large scale deployment for multi-parameter traffic monitoring.

Embodiments described herein involve fibers with FBG array inscribed are embedded into pavement to sense objects (e.g., vehicles and/or pedestrians) moving on the pavement above. FIG. 1A illustrates a diagram of an FO traffic monitoring system in accordance with embodiments described herein. Vehicles traveling in the sensing region 105 may induce pavement deformation, which may cause strain on the pavement-embedded sensors 120 and produce an FBG wavelength shift signal. Fibers are connected to an FBG interrogator at one end, where the center wavelength of each FBG on the fiber is tracked at a desired frequency. The center wavelengths of FBGs can be streamed to a processor 130 having a data collection module 132 and an analytics module 134 where the information is translated into traffic parameters. The traffic parameters may include one or more of vehicle speed, a traffic volume, a number of axles of at least one vehicle on the road, a vehicle classification of the at least one vehicle on the road, vehicle location in a lane, a vehicle weight, and a weight per axle of the at least one vehicle on the road, for example. The extracted information can then be transferred to a predetermined location via a transmitter 140. For example, the extracted information may be transferred to the cloud, enabling a remote-control center to use the information for traffic and/or road condition management. In some embodiments, the information translation can happen after the raw sensing data are transferred to the cloud.

Typically, there are multiple FBG sensors on one fiber. The center wavelength of each FBG's reflection band distributes in a certain wavelength range. For example, the wavelength range can be from 1510 nm-1590 nm. In one embodiment, the reflection wavelength of each FBG on the same fiber has certain spacing in the spectrum. For example, the spectral spacing of FBGs on the same fiber can be ~2-3 nm. In the wavelength range 1510-1590 nm, a 3 nm spacing will allow ~26 FBGs on one fiber to be interrogated simultaneously. In another embodiment, FBGs on the same fiber can have overlapped reflection bands and signals from different FBGs are distinguished by additional time domain features (e.g., reflection time). In general, the sensing fiber design for this application needs to consider the level of multiplexing needed and trade-off between system performance (sampling rate, wavelength accuracy, etc.) and overall cost (hardware, installation, maintenance, etc.)

Figure 1B:
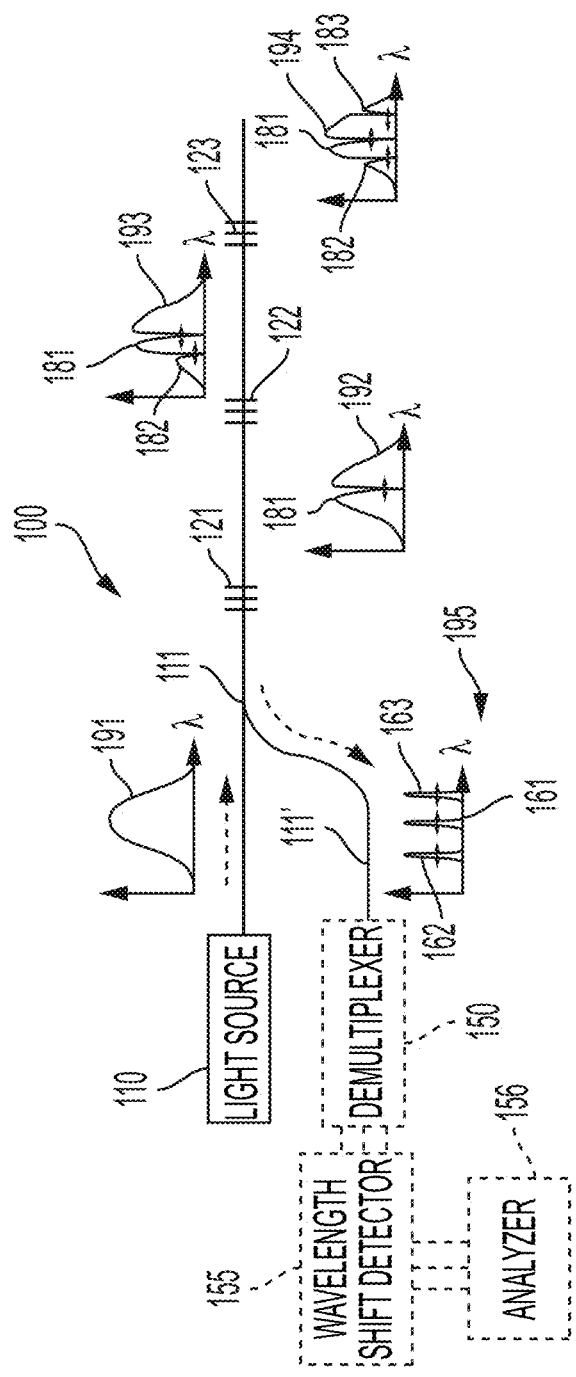
FIG. 1B shows a wavelength multiplexed system can use a compensated sensor array comprising multiple FBG sensors disposed on a single optical fiber in accordance with embodiments described herein.
Figure 2A:
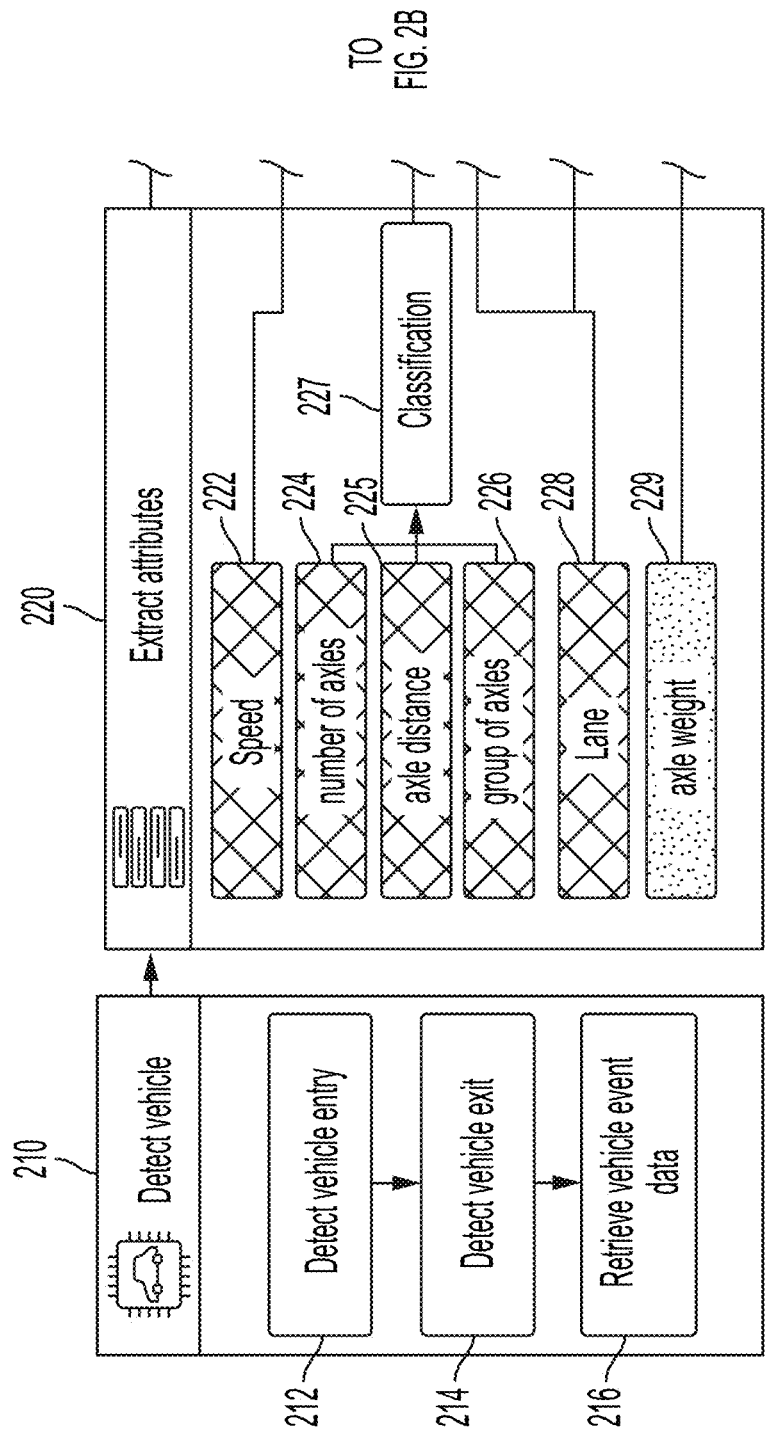
FIGS. 2A and 2B show more detailed views of the analytics module in accordance with embodiments described herein.
Figure 2B:
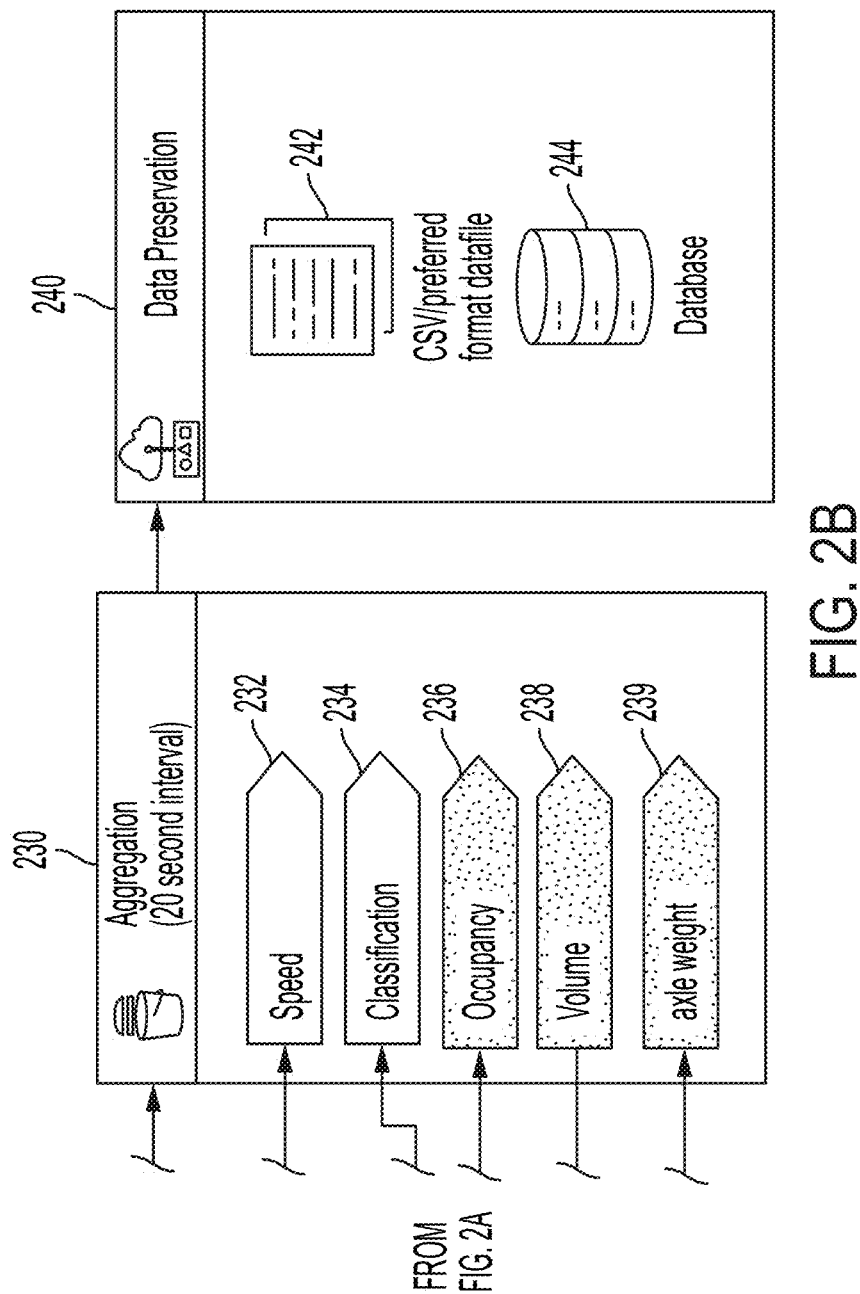

FO sensors can simultaneously measure multiple parameters distributed in space with high sensitivity in multiplexed configurations over long FO cables. One example of how this can be achieved is through fiber Bragg grating (FBG) sensors. FIG. 1B shows a wavelength multiplexed system 100 can use a compensated sensor array comprising multiple FBG sensors 121, 122, 123 disposed on a single optical fiber 111. The sensors 121-123 may be arranged to sense parameters including one or more of temperature, strain, and/or vibration, for example. As indicated in FIG. 1B, input light is provided by the light source 110, which may comprise or be a light emitting diode (LED) or superluminescent laser diode (SLD), for example. The spectral characteristic (intensity vs. wavelength) of broadband light is shown by inset graph 191. The intensity is highest near the middle of the spectrum and falls off at the spectrum edges. The sensors 121, 122, 123 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 111 to the first FBG sensor 121. The first FBG sensor 121 reflects a portion of the light in a first wavelength band having a central wavelength, $\lambda 1$. Light having wavelengths other than within the first wavelength band is transmitted through the first FBG sensor 121 to the second FBG sensor 122. The spectral characteristic of the light transmitted to the second FBG sensor 122 is shown in inset graph 192 and exhibits a notch 181 at the first wavelength band centered at $\lambda 1$ indicating that light in this wavelength band is reflected by the first sensor 121.

The second FBG sensor 122 reflects a portion of the light in a second wavelength band having a central wavelength, $\lambda 2$. Light that is not reflected by the second FBG sensor 122 is transmitted through the second FBG sensor 122 to the third FBG sensor 123. The spectral characteristic of the light transmitted to the third FBG sensor 123 is shown in inset graph 193 and includes notches 181, 182 centered at $\lambda 1$ and $\lambda 2$.

The third FBG sensor 123 reflects a portion of the light in a third wavelength band having a central or peak wavelength, $\lambda 3$. Light that is not reflected by the third FBG sensor 123 is transmitted through the third FBG sensor 123. The spectral characteristic of the light transmitted through the third FBG sensor 123 is shown in inset graph 194 and includes notches 181, 182, 183 centered at $\lambda 1$, $\lambda 2$, and $\lambda 3$.

Light in wavelength bands 161, 162, 163, having central wavelengths $\lambda 1$, $\lambda 2$ and $\lambda 3$ (illustrated in inset graph 195) is reflected by the first, second, or third FBG sensors 121, 122, 123, respectively, along the FO cables 111 and 111' to an the optical wavelength demultiplexer 150. Compensating input characteristics of sensors 121, 122, 123 cause the difference in the intensity peaks of the light 161, 162, 163 to be reduced when compared to the intensity peaks from an uncompensated sensor array.

From the wavelength demultiplexer 150, the sensor light 161, 162, 163 may be routed to a wavelength shift detector 155 that generates an electrical signal responsive to shifts in the central wavelengths $\lambda 1$, $\lambda 2$ and $\lambda 3$ and/or wavelength bands of the sensor light. The wavelength shift detector 155 receives reflected light from each of the sensors and generates corresponding electrical signals in response to the shifts in the central wavelengths $\lambda 1$, $\lambda 2$ and $\lambda 3$ or wavelength bands of the light reflected by the sensors 121-123. The analyzer 156 may compare the shifts to a characteristic base wavelength (a known wavelength) to determine whether changes in the values of the parameters sensed by the sensors 121-123 have occurred. The analyzer 156 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having WB2 during time period 2 and sense reflected light during time period 2a that overlaps time period 2. Following time period 2a, the light source may emit light having WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

The FO cable may comprise a single mode (SM) FO cable or may comprise a multi-mode (MM) FO cable. While single mode fiber optic cables offer signals that are easier to interpret, to achieve broader applicability and lower costs of fabrication, multi-mode fibers may be used. MM fibers may be made of plastic rather than silica, which is typically used for SM fibers. Plastic fibers may have smaller turn radii when compared with the turn radii of silica fibers. This can offer the possibility of curved or flexible configurations, for example. Furthermore, MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

Figures 1, 16A:
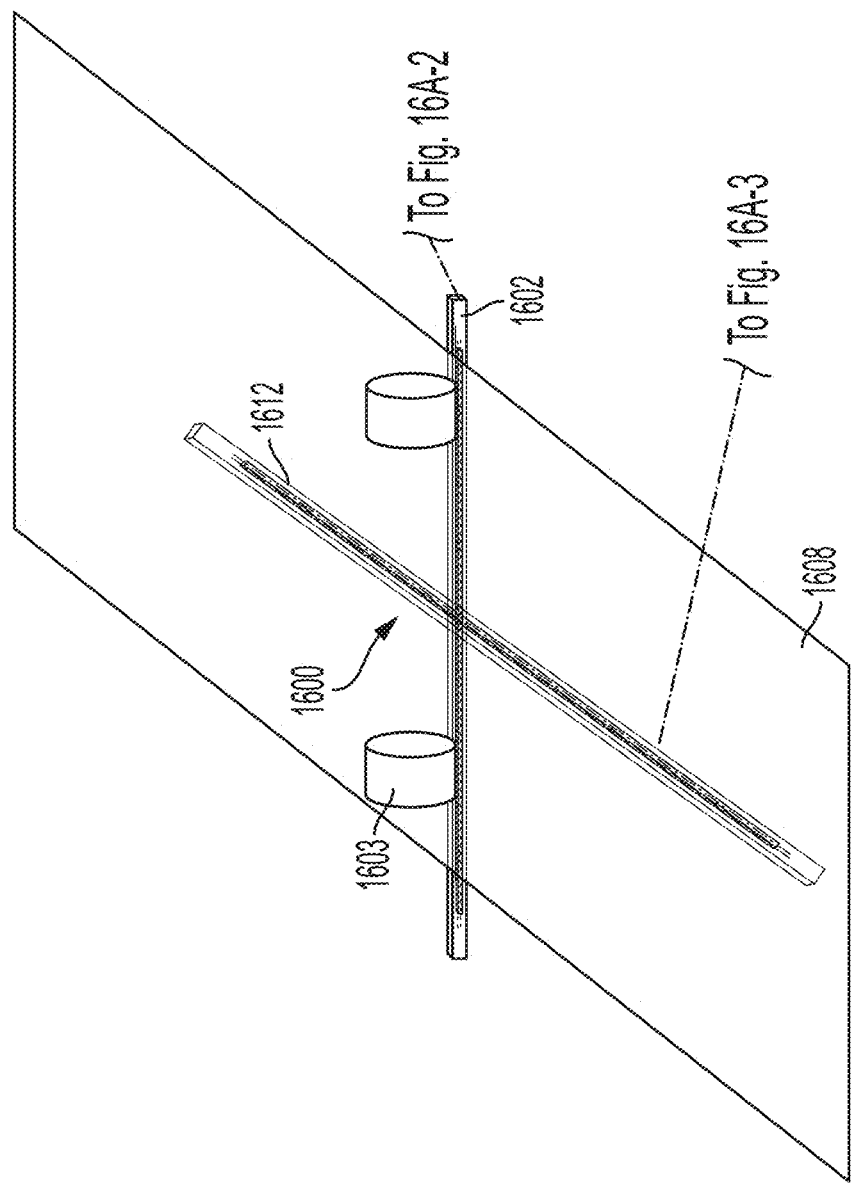
FIGS. 16A-1, 16A-2, 16A-3, 16B, and 16C illustrate a sensor network comprising lateral fiber sensors and longitudinal fiber sensors, and signals produced by such sensors in accordance with various embodiments.
Figures 2, 16A:
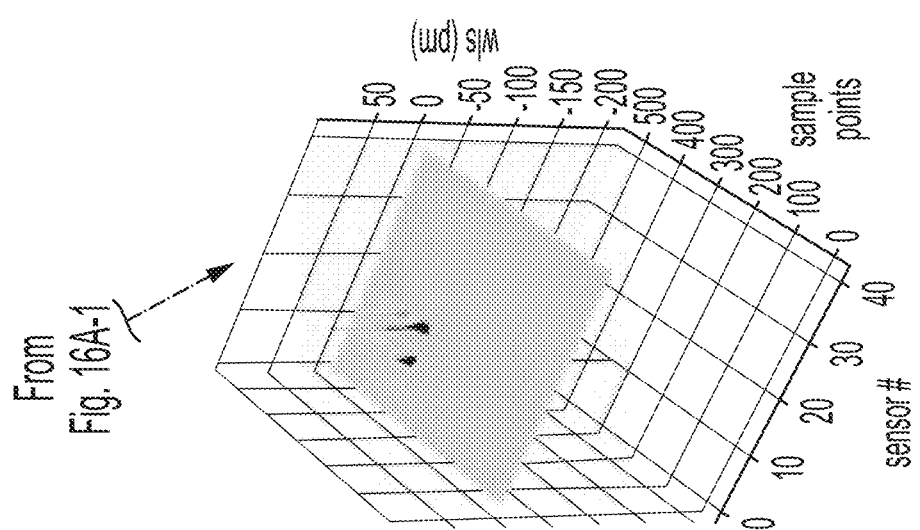
Figures 3, 16A:
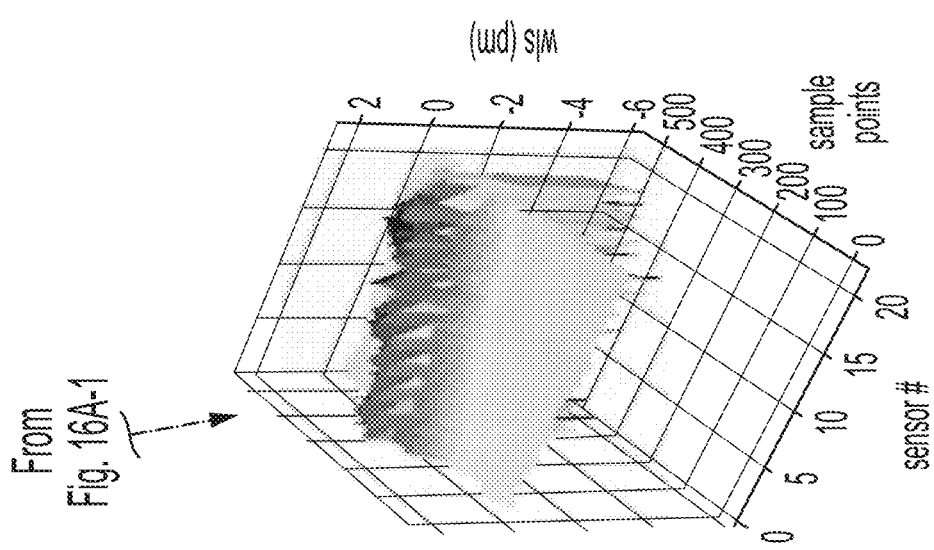

FIG. 2 shows a more detailed view of the analytics module 130 in accordance with embodiments described herein. A vehicle detection module 210 may be configured to detect vehicle entry 212. Detecting vehicle entry may include determining a time at which a vehicle enters a sensing zone (e.g., in a location between two adjacent optical fibers). For example, detecting vehicle entry may involve detecting when a vehicle first crosses over an embedded FO sensor. Similarly, the vehicle detection module 210 may be configured to detect vehicle exit 214. Detecting vehicle exit may include determining a time at which a vehicle exits a sensing zone. For example, detecting vehicle exit may involve detecting when a last axle of a vehicle crosses over an embedded FO sensor and/or exits the sensing zone comprising one or more embedded FO sensors. Vehicle event data may be retrieved 216 based on the sensor data.

An attribute extraction module 220 may be configured to extract various traffic attributes and/or vehicle attributes in accordance with embodiments described herein. The attributes may include one or more of speed 222, number of axles 224, distance between axles 225, group of axles 226, what lane the vehicle is travelling in 228, a weight per axle 229, and/or a vehicle classification 227 for a predetermined jurisdiction. Other types of attributes may also be extracted. For example, a direction of travel of a vehicle may be extracted.

The attributes may be aggregated 230 to determine other characteristics about the vehicles and/or traffic travelling on the road. The aggregated attributes may include information about multiple vehicles within a predetermined time period (e.g., 20 seconds). According to various embodiments, the attributes of more than one vehicle may be aggregated to determine one or more of aggregated speed 232, classification 234, and axle weight 239. In some cases, the attributes may be aggregated to determine one or more of occupancy 236 and/or a volume of vehicles travelling on the road 238. The aggregated traffic speeds may be used to understand traffic bottlenecks, for example. Vehicle classification and/or axle weight data may be used to understand road wear and/or usage patterns from aggregated data, for example. One or more of raw data, attribute data, and/or aggregated data may be stored 240 in a database 244 and/or in a preferred data file 242 (e.g., CSV).

Figure 3A:
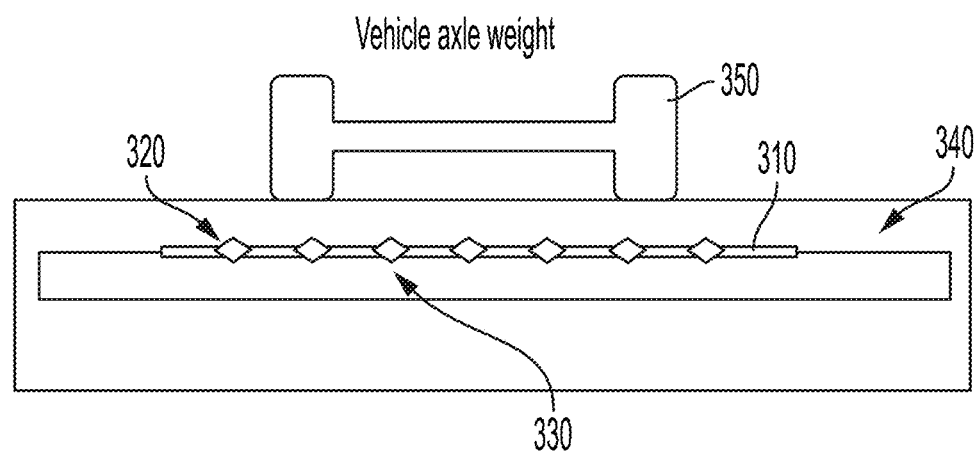
FIGS. 3A and 3B illustrates an example of a sensing system for monitoring traffic and/or vehicle parameters in accordance with embodiments described herein.
Figure 3B:
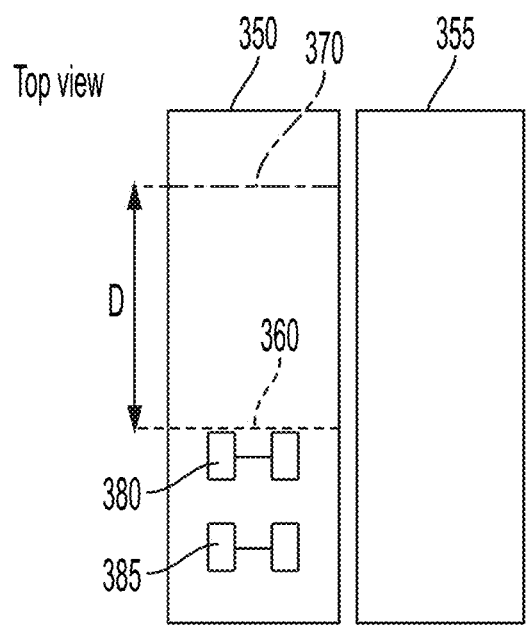

FIGS. 3A and 3B illustrates an example of a sensing system for monitoring traffic and/or vehicle parameters in accordance with embodiments described herein. Two optical fibers 360, 370 are installed substantially parallel to each other. In some cases, the optical fibers are installed in a configuration where at least two of the optical fibers are not installed substantially parallel to each other. Each optical fiber 360, 370 has a plurality of FO sensors 320 are installed substantially perpendicular to the direction of traffic. For example, the second optical fiber 370 may be installed a predetermined distance, D, from the first optical fiber 360. D may be in a range of about 0.5 m to about 5 m. In some cases, D is in a range of about 1 m to about 3 m.

In some cases, the optical fibers 360, 370 may be supported in the pavement by a support bar and/or a support structure 330 in the road pavement 340. According to various embodiments, the optical fibers may be installed in trenches within or underneath the pavement. Some embodiments for installing optical fibers are described in more detail in U.S. patent application Ser. No. 17/393,927, which is incorporated by reference in its entirety. According to various embodiments, there may be more than two optical fibers and/or the optical fibers may be installed in a configuration other than perpendicular to the direction of traffic. While FIGS. 3A and 3B show the optical fiber installed on and/or under two lanes 350, 355, it is to be understood that the optical fiber may be installed on and/or under any number of lanes.

Figure 3C:
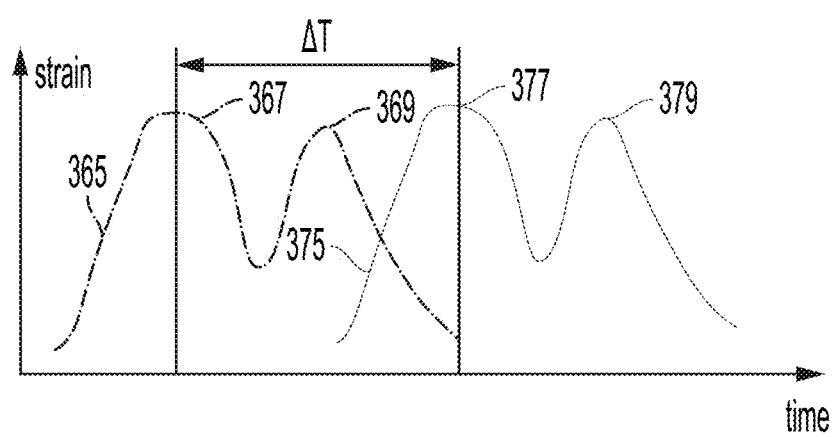
FIG. 3C shows the stimulated strain in pavement that can be captured by the sensors in accordance with embodiments described herein.

When an axle 380, 385 of a vehicle passes the sensors, the stimulated strain in pavement can be captured by the sensors as shown in FIG. 3C. A first curve 365 represents the vehicle axles 380, 385 passing over the first optical fiber 360. The peaks 367, 369 represent the first axle 380 and the second axle 385 passing over the first optical fiber 360, respectively. Similarly, a second curve 375 represents the vehicle axles 380, 385 passing over the second optical fiber 370. The peaks 377, 379 represent the first axle 380 and the second axle 385 passing over the second optical fiber 370, respectively.

Vehicle and traffic attributes can then be inferred from the temporal-spatial sensor data. For example, a simple vehicle speed estimate may be determined by calculating the time it takes for the first axle 380 to travel from the first optical fiber 360 to the second optical fiber ($\Delta t$). Since the distance between the two fiber lines are known (D), vehicle speed can be simply calculated as shown in (1).

$$v = D/\Delta t \quad (1)$$

Figure 4:
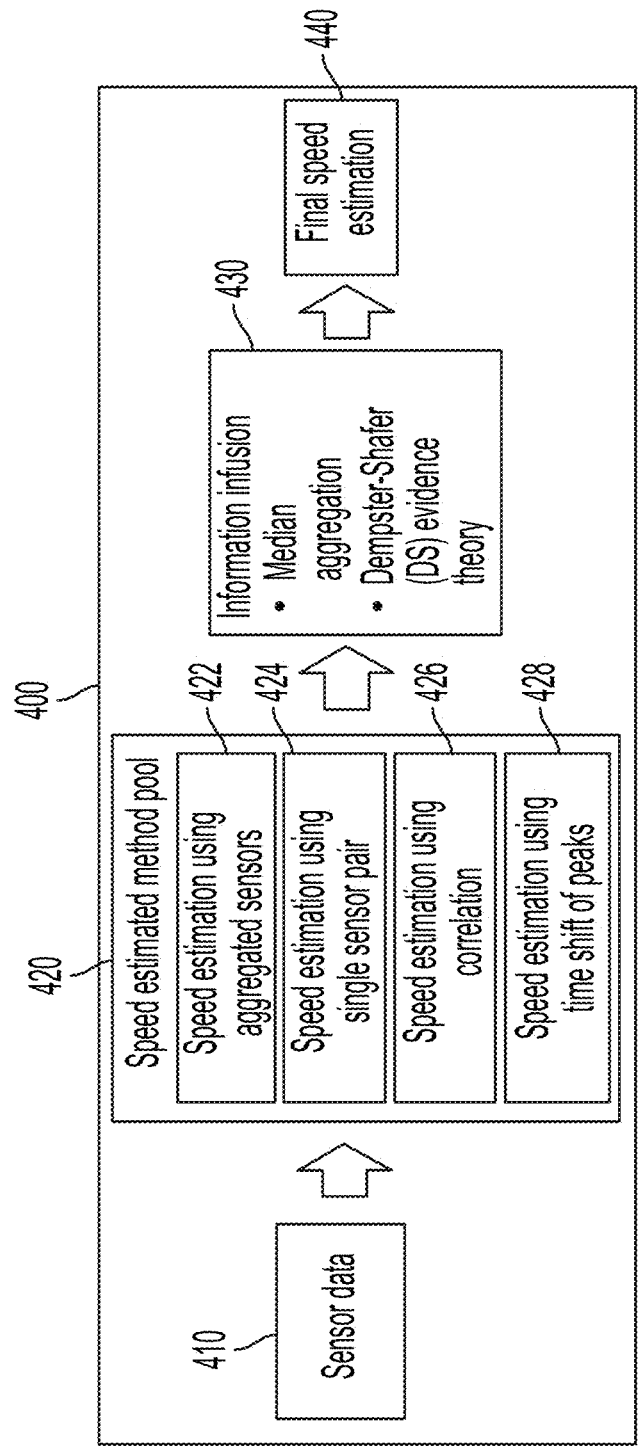
FIG. 4 depicts a system that uses the ensemble method in accordance with embodiments described herein.

Another method to estimate speed is to use the correlation between the time series data from the two fiber lines. An ensemble method is utilized to increase robustness of the method to sensor errors or misalignment of sensor data. FIG. 4 depicts a system 400 that uses the ensemble method in accordance with embodiments described herein. Sensor data 410 is used to estimate speed using one or more of the speed estimation modules 422, 424, 426, 428 of the speed estimation method pool 420. The information infusion module 430 that may use an averaging mechanism (e.g., median and/or mean aggregation). In some implementations, a more sophisticated information infusion method such as Dempster-Shafer rule theory can be utilized to merge the estimations from multiple approaches. The result of the merged estimations results in the final speed estimation 440.

Figure 5:
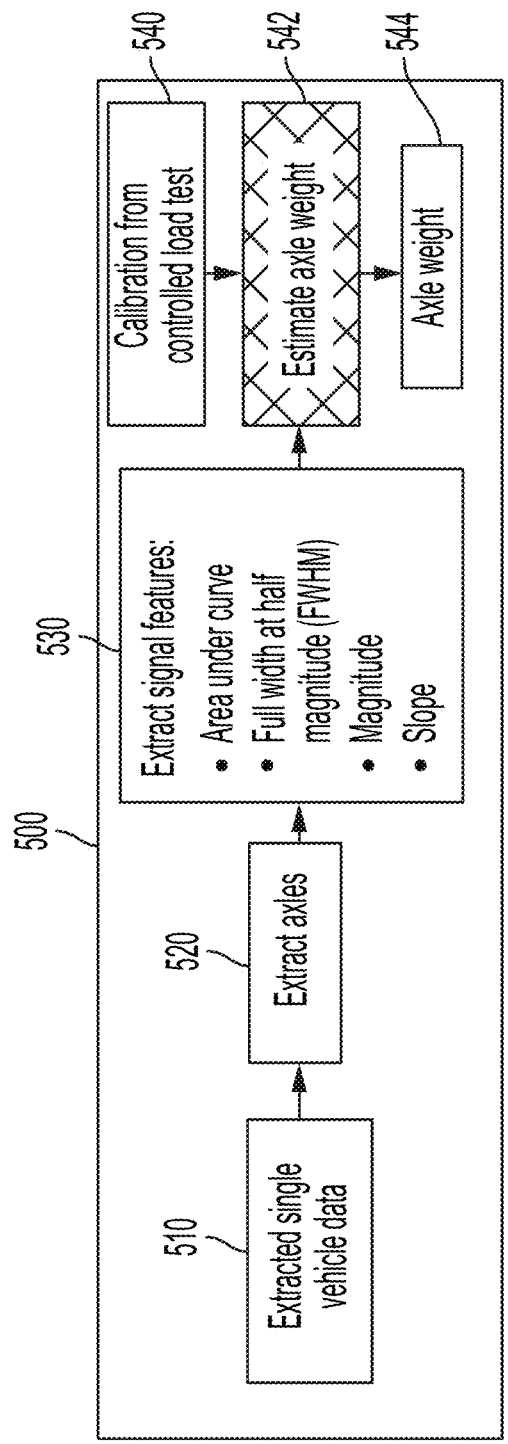
FIG. 5 shows a system for determining various axle attributes is shown in accordance with embodiments described herein.

A system 500 for determining various axle attributes is shown in FIG. 5 in accordance with embodiments described herein. Single vehicle data is extracted 510. A number of axles is extracted 520 by detecting peaks from the sensor data relevant to one vehicle. The extracted axles may be then grouped based on proximity rules. For example, if the distance between two axles is less than a predetermined distance (e.g., 2 m), they can be counted as one axle group. Various signal features may be extracted 530 from the single vehicle data. For example, the signal features may include one or more of an area under a curve, a full width at half magnitude, a magnitude at one or more times, and/or one or more slopes. Axle weight may be extracted 542 from a regression model that takes a set of axle signal features as input, as depicted. According to various embodiments, the regression model may additionally or alternatively use calibration data 540 from a controlled road test as an input. The system 500 may then output the axle weight 544 based on the estimated axle weight 542.

According to various embodiments, vehicle type may be inferred from the estimated vehicle speed and/or axle attributes. In some implementations, a strict rule-based system is utilized to classify vehicles based on vehicle length, number of axles and/or number of axle groups. In some cases, fuzzy logic may be used to classify vehicles based on vehicle length, number of axles and number of axle groups, considering the uncertainties of the estimated axle attributes.

Figure 6A:
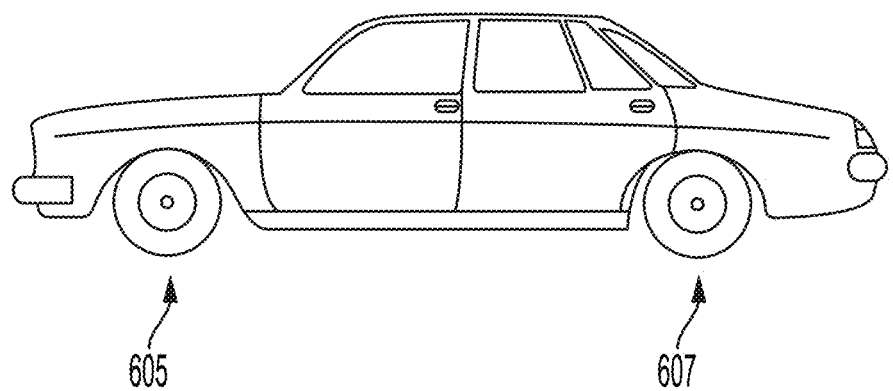
FIGS. 6A-6C illustrates vehicle classification for a small vehicle in accordance with embodiments described herein.
Figure 6B:
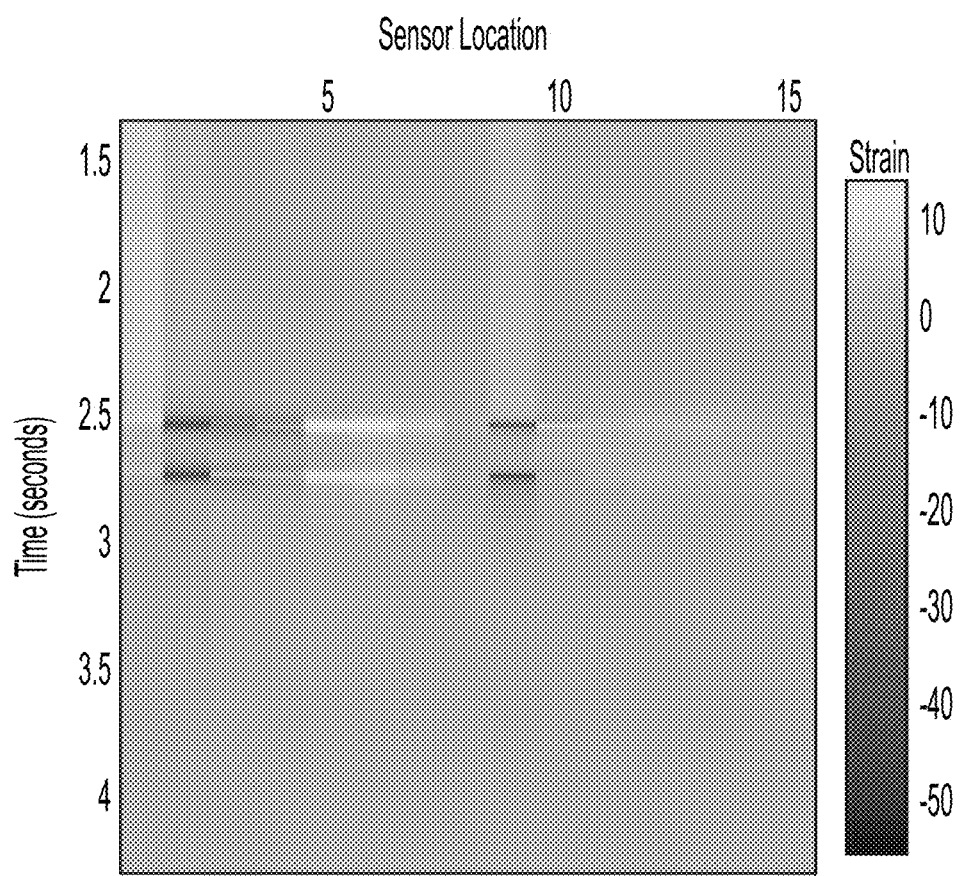
Figure 6C:
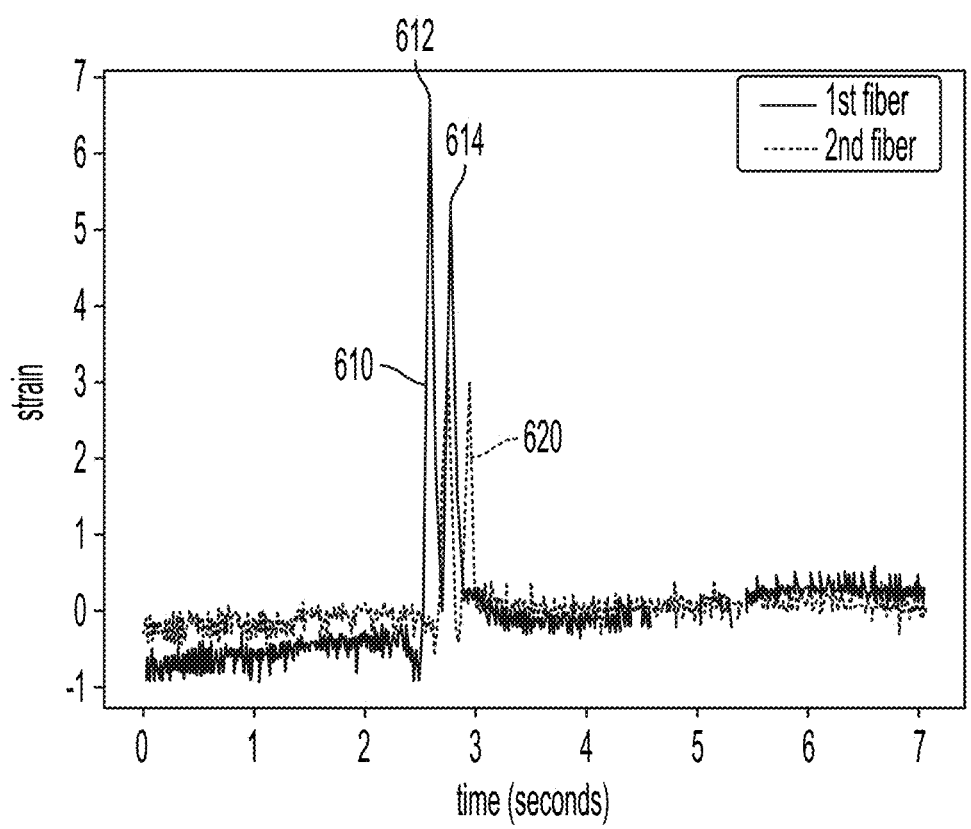

FIGS. 6A-6C illustrates vehicle classification for a small vehicle in accordance with embodiments described herein. An example of a small vehicle is shown in FIG. 6A. FIG. 6B shows a strain heat map for a small vehicle. FIG. 6C illustrates the strain versus time for the first fiber 610 and the second fiber 620. Using the first fiber 610 as an example, it can be observed that there are two strain peaks 612, 614 corresponding to the first axle 605 and the second axle 607, respectively. According to various embodiments described herein, the heat map illustrates an example of a 2D representation of a vehicle. Other types of representations may be used. In some cases, a 3D representation of the vehicle may be created based on the sensor data.

Figure 7A:
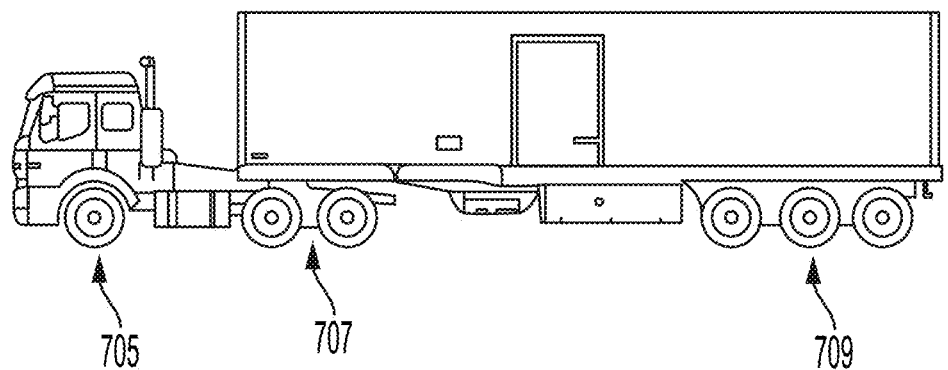
FIGS. 7A-7C illustrates vehicle classification for a six axle vehicle in accordance with embodiments described herein.
Figure 7B:
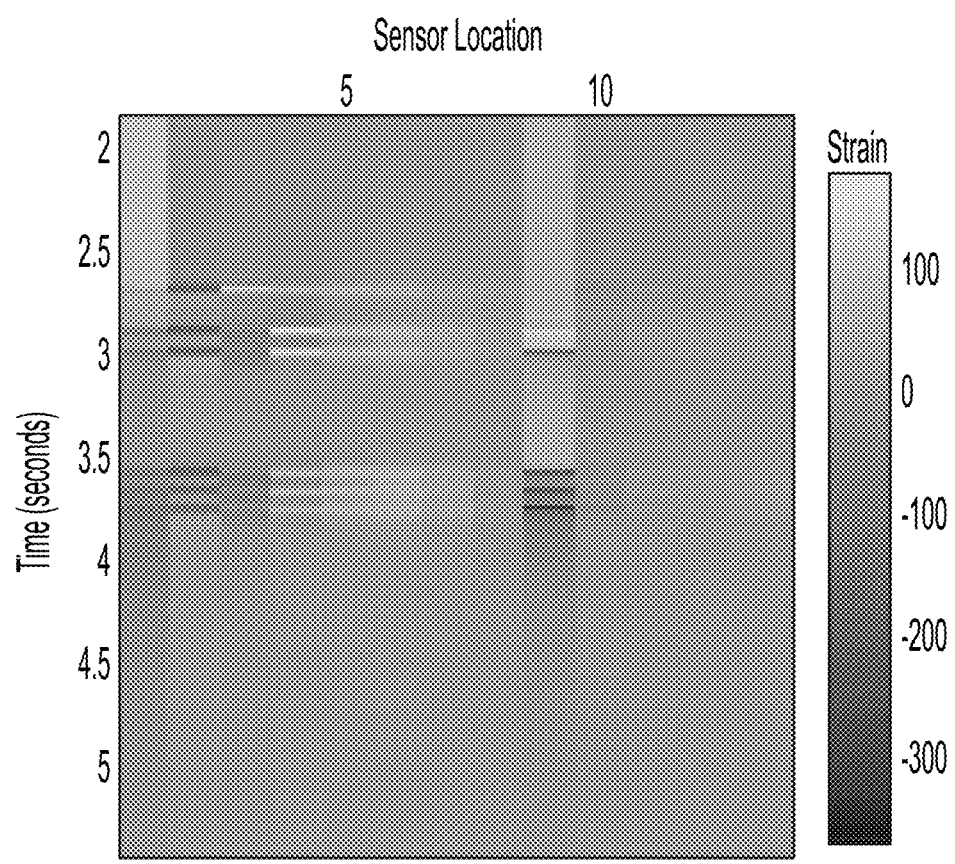
Figure 7C:
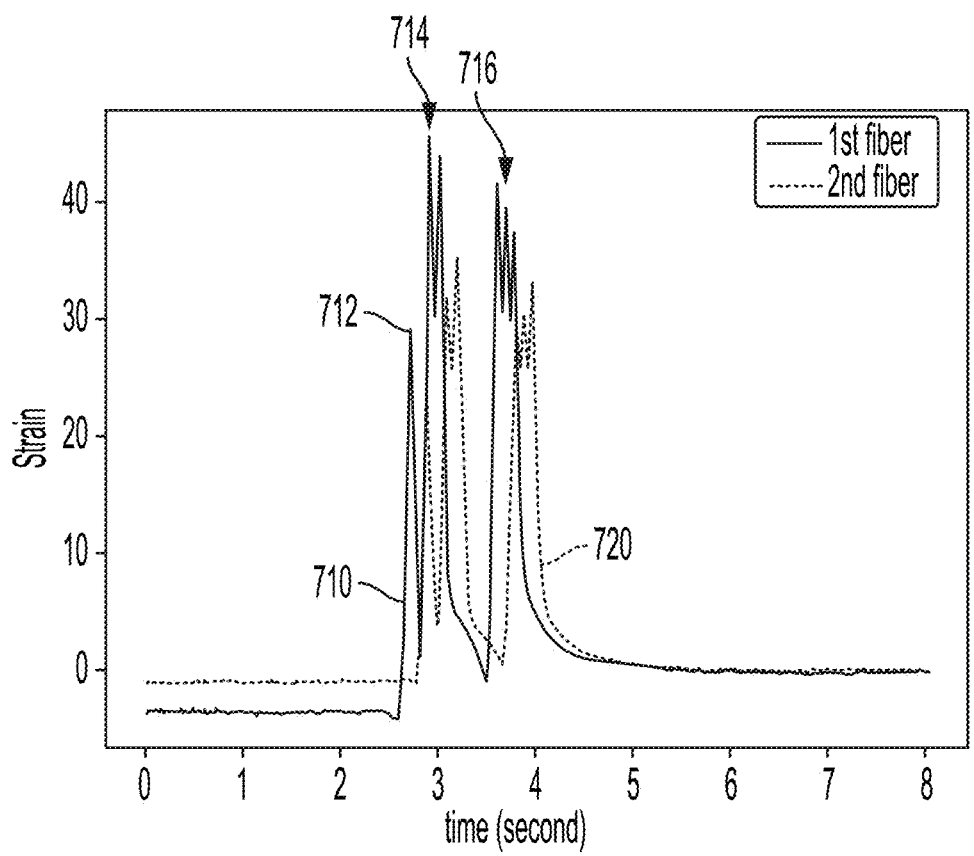

FIGS. 7A-7C illustrates vehicle classification for a six-axle vehicle in accordance with embodiments described herein. An example of a six-axle vehicle is shown in FIG.

7A. FIG. 7B shows a strain heat map for an example six-axle vehicle. FIG. 7C illustrates the strain versus time for the first fiber 710 and the second fiber 720. Using the first fiber 710 as an example, it can be observed that there are three strain peak groups 712, 714, 716. The first strain peak group 712 corresponds to the first axle group 705. The second strain peak group 714 corresponds to the second axle group 707. In this example, the second axle group 707 has two axles and two corresponding peaks in the second strain peak group 714. The third strain peak group 716 corresponds to the third axle group 709. In this example, the third axle group 709 has three axles and three corresponding peaks in the third strain peak group 716.

Figure 8A:
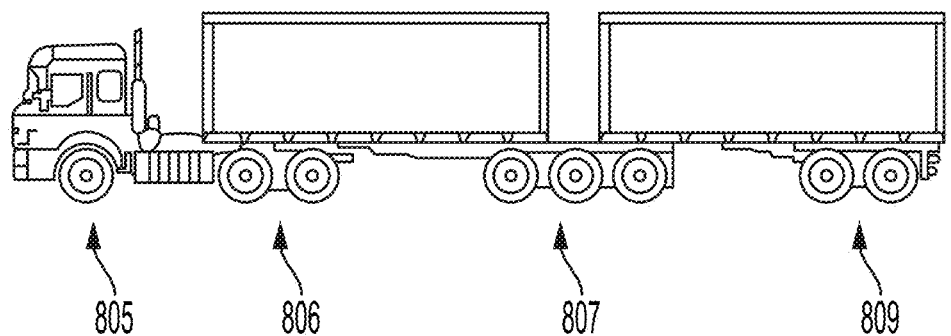
FIGS. 8A-8C illustrates vehicle classification for a larger vehicle in accordance with embodiments described herein.
Figure 8B:
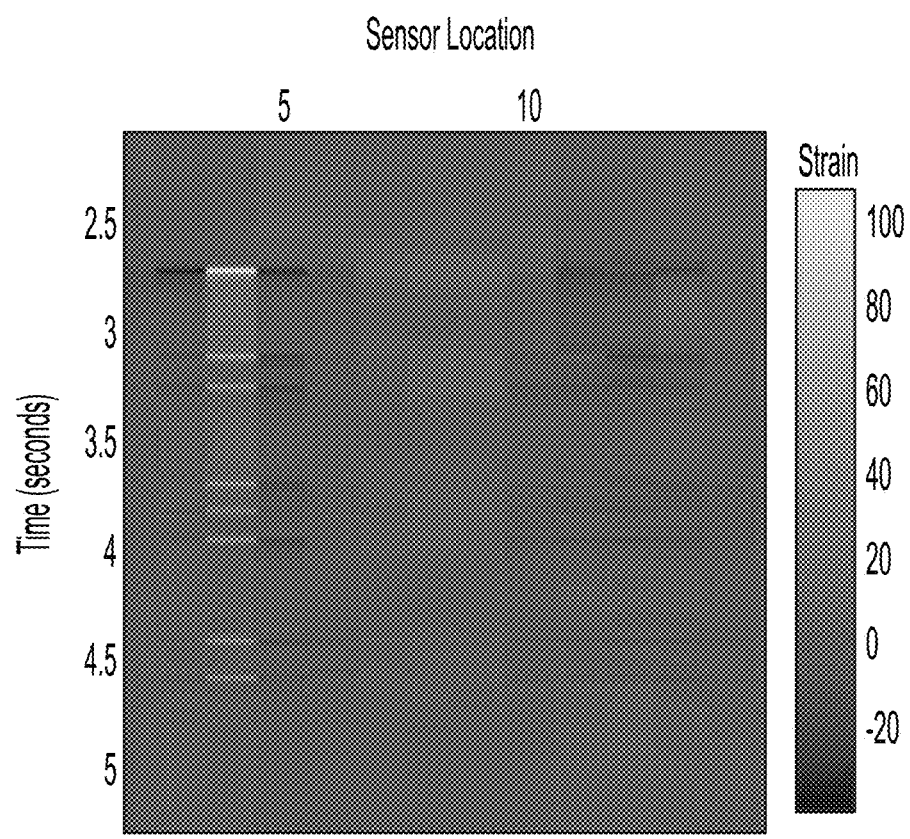
Figure 8C:
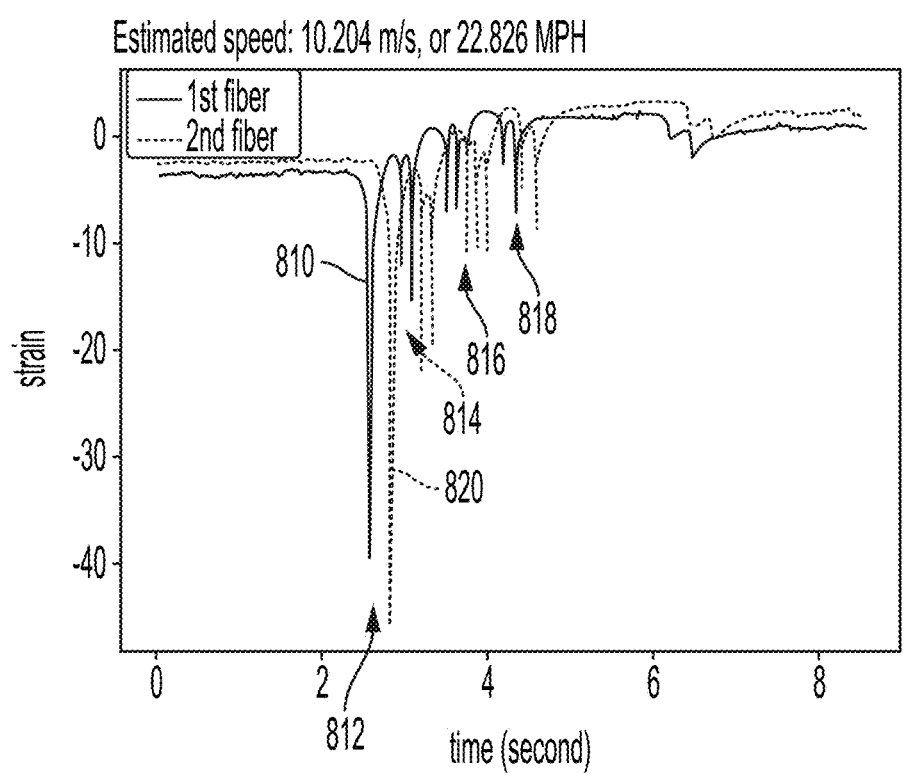

FIGS. 8A-8C illustrates vehicle classification for a larger vehicle in accordance with embodiments described herein. These types of larger vehicles as well as other types of vehicles may be detected using speed estimation, time of flight between fiber lines, and/or other signal features. An example of an eight-axle vehicle is shown in FIG. 8A. FIG. 8B shows a strain heat map for an example six axle vehicle. FIG. 8C illustrates the strain versus time for the first fiber 810 and the second fiber 820. Using the first fiber 810 as an example, it can be observed that there are four strain peak groups 812, 814, 816, 818. The first strain peak group 812 corresponds to the first axle group 805 having a single peak. The second strain peak group 814 corresponds to the second axle group 806. In this example, the second axle group 806 has two axles and two corresponding peaks in the second strain peak group 814. The third strain peak group 816 corresponds to the third axle group 807. In this example, the third axle group 807 has three axles and three corresponding peaks in the third strain peak group 816. The fourth strain peak group 818 corresponds to the fourth axle group 809. In this example, the fourth axle group 809 has two axles and two corresponding peaks in the fourth strain peak group 818.

Figure 9:
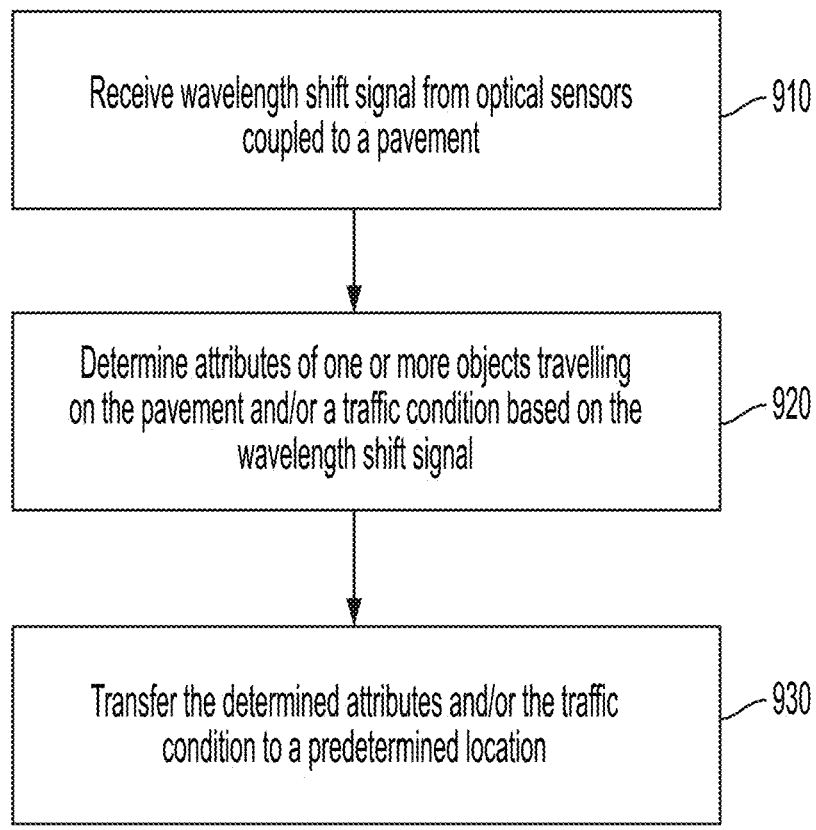
FIG. 9 illustrates a process for monitoring traffic and/or vehicle parameters in accordance with embodiments described herein.

FIG. 9 illustrates a process for monitoring traffic and/or vehicle parameters in accordance with embodiments described herein. A wavelength shift signal is received 910 from a plurality of optical sensors coupled to a pavement. The optical sensors may be disposed on at least two optical fibers. Each optical fiber is disposed a predetermined distance from at least one other optical fiber. The wavelength shift signal may comprise a strain signal. The pavement may include one or more of a walkway, a road, and a bridge.

One or both of one or more attributes of one or more objects travelling on the pavement and a traffic condition are determined 920 based on the one or more wavelength shift values. The objects may include one or more of vehicles and pedestrians. The attributes may comprise one or more of a speed of the one or more objects, direction of travel, a number of axles of the one or more objects, a distance between axles of the one or more objects, a group of axles of the one or more objects, a lane of traffic that the one or more objects are travelling in, a lane straddling condition of the one or more objects and/or a weight per axle for the one or more objects. One or more of the attributes may be aggregated to determine one or more of an object classification, a road occupancy, and a traffic volume of the road. An alert may be issued based on the wavelength shift signal. For example, an alert may be issued if one or more of a determined vehicle classification, weight, and/or speed of a vehicle exceeds the specifications for the type of pavement that it is travelling on.

According to various embodiments, the speed may be determined by aggregating two or more sensors. In some cases, the speed of the one or more objects is determined using a single sensor pair. The speed of the one or more objects may be determined using correlation between a first wavelength shift signal received from sensors disposed on a first optical fiber and a second wavelength shift signal received from sensors disposed on a second optical fiber. In some cases, the speed of the one or more objects is determined using a time shift of wavelength shift peaks of the wavelength shift signal.

One or both of the one or more attributes and the traffic condition may be transferred 930 to a predetermined location. For example, the attributes and/or the traffic condition may be transferred to a database and/or to an operator terminal.

Other types of vehicle and/or traffic attributes may be detected using the systems and methods described herein. For example, lane straddling may be monitored by creating a virtual lane that is centered around the dividing line. For example, in a two-lane road, a virtual lane is created that includes of about half of the sensors from both lanes.

There is significant interest in the weigh-in-motion (WIM) applications for traffic systems to report vehicle parameters, including vehicle speed, vehicle class, vehicle location in the lane, and vehicle axle weight or gross weights. Sensing the traffic loads on roads and bridges can help to improve pavement design, bridge maintenance, and traffic management, which contribute to autonomous sensing and decision-making in smart cities.

Various embodiments are directed to apparatuses and methods for high-speed WIM applications using fiber optic sensors. According to various embodiments, the axle group weight and gross weight of moving vehicles can be estimated from fiber optic sensor responses. Although the term high-speed WIM applications can vary from one jurisdiction to another, the term high-speed for WIM applications typically refers to speeds greater than about 30 km/h. It is understood that embodiments are also directed to apparatuses and methods for low-speed WIM applications (e.g., speeds less than 30 km/h).

Traditional sensors used for in-road WIM applications include piezoelectric sensors, electromagnetic loops, and strain gauges installed on the road within the pavement. The accuracy of these sensors is low when applied to high-speed WIM measurements. Moreover, electromagnetic loops suffer from electromagnetic interference (EMI), and piezoelectric sensors are limited to short-distance transmission. As discussed previously, embodiments of the disclosure utilize fiber optic sensors installed in-road which provides for a high spatial resolution of the vehicle on the lanes and measuring the vehicle weight without EMI, while requiring less maintenance than traditional sensors. The high spatial resolution of the fiber optic sensors provides for an enhanced stress/strain distribution when a vehicle passes by the sensors, and the methodology described herein can utilize the enhanced spatial-temporal resolution to increase the accuracy performance of high-speed WIM applications.

Figure 10:
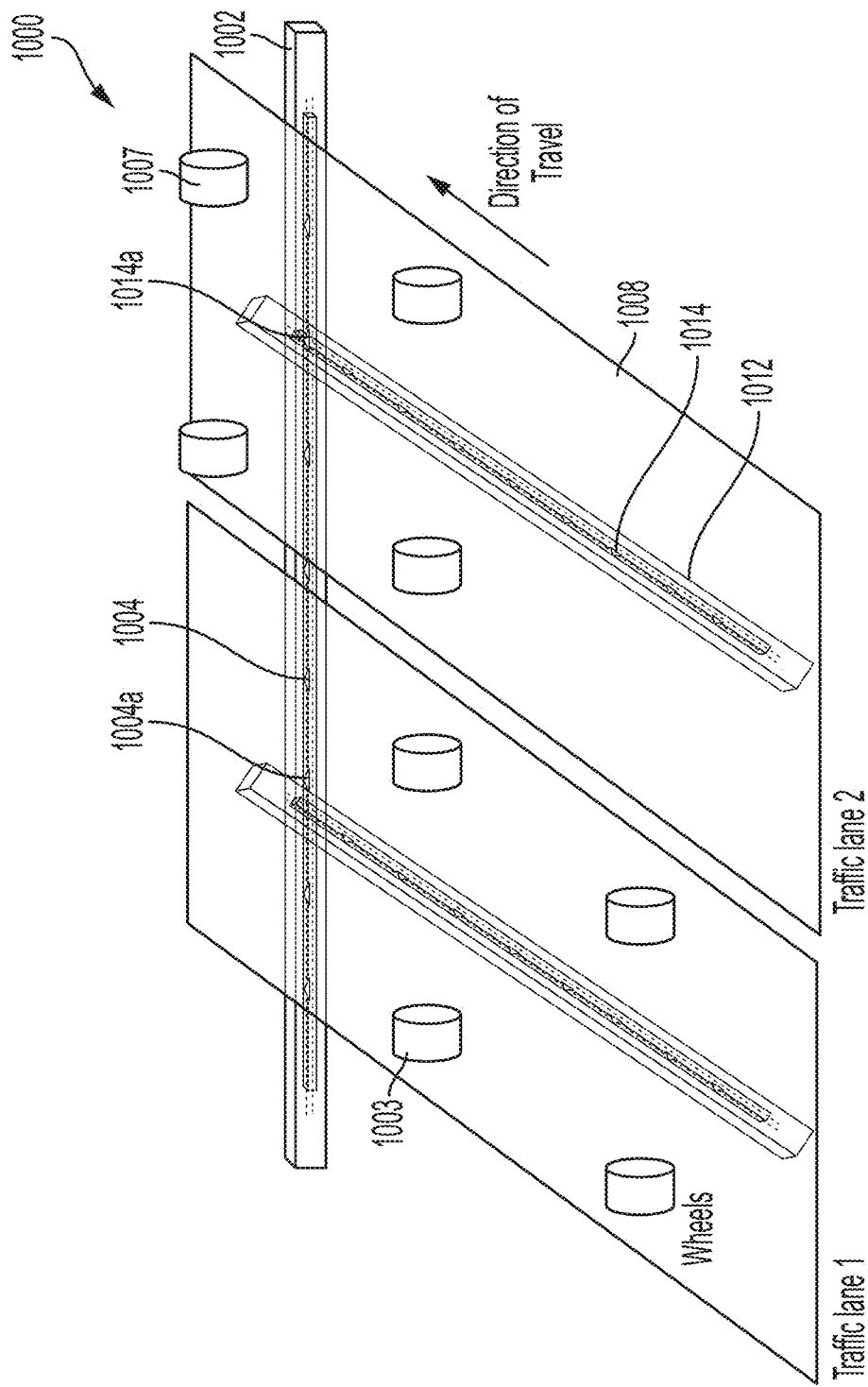
FIG. 10 illustrates a fiber optical sensor arrangement configured for high-speed weigh-in-motion applications in accordance with various embodiments.

Referring now to FIG. 10, there is illustrated a fiber optical sensor arrangement configured for high-speed WIM applications in accordance with various embodiments. FIG. 10 shows a sensor network 1000 comprising at least one lateral fiber 1002 and at least one longitudinal fiber 1012. As discussed previously, the lateral fiber 1002 and the longitudinal fiber 1012 are preferably embedded in trenches cut into the pavement 1008. Support materials, such as metal bars or plates, can be used together with one or more spacers to further stabilize the fibers 1002, 1012 inside the trenches in a manner disclosed in commonly owned U.S. patent application Ser. No. 17/393,927, filed on Aug. 4, 2021, which is incorporated herein by reference in its entirety.

The lateral fiber 1002 comprises optical sensors 1004 coupled to pavement 1008 in a transverse orientation relative to a direction of vehicle travel along the pavement 1008. The longitudinal fiber 1012 comprises optical sensors 1014 coupled to pavement 1008 in a longitudinal orientation (e.g., substantially parallel) relative to the direction of vehicle travel. In the representative embodiment shown in FIG. 10, a first longitudinal fiber 1012 is installed at or near the center of traffic lane 1, with wheels 1003 of a first vehicle shown straddling the first longitudinal fiber 1012. A second longitudinal fiber 1012 is installed at or near the center of traffic lane 2, with wheels 1007 of a second vehicle shown straddling the second longitudinal fiber 1012. The network of distributed fiber optics sensors 1004, 1014 embedded in the pavement 1008 provides for continuous sensing of vehicle movement along the pavement 1008.

Wavelength shift signals produced by the optical sensors 1004 of the lateral fiber 1002 are used to determine the location of the wheels 1003, 1007 of vehicles passing by the lateral fiber 1002. A mid-lateral optical sensor 1004a, 1014a can be used for determining an estimation of the vehicle's weight. The mid-lateral optical sensor 1004a, 1014a is an optical sensor which is closest to a midway point between left and right wheels 1003, 1007 of each vehicle, irrespective of the location of the vehicle within the traffic lane. Wavelength shift signals produced by the optical sensors 1014 of the longitudinal fiber 1012 are used to determine an estimation of the vehicle's weight and an estimation of the vehicle's speed.

Figure 11A:
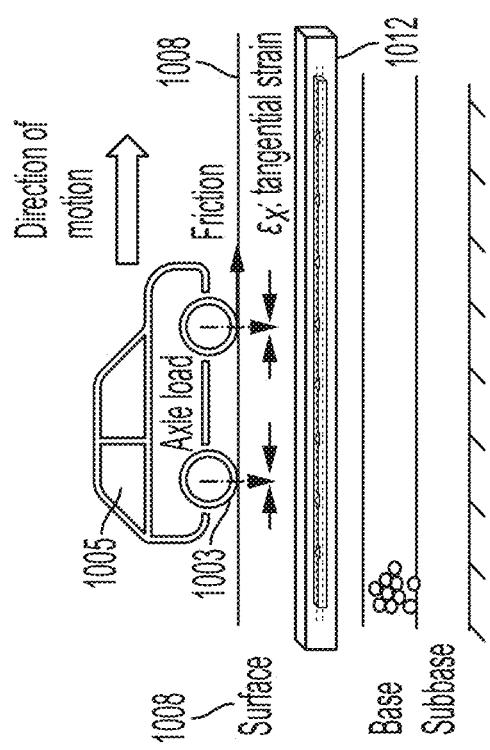
FIGS. 11A and 11B show additional details of the lateral fiber and longitudinal fiber strain distribution shown in FIG. 10.
Figure 11B:
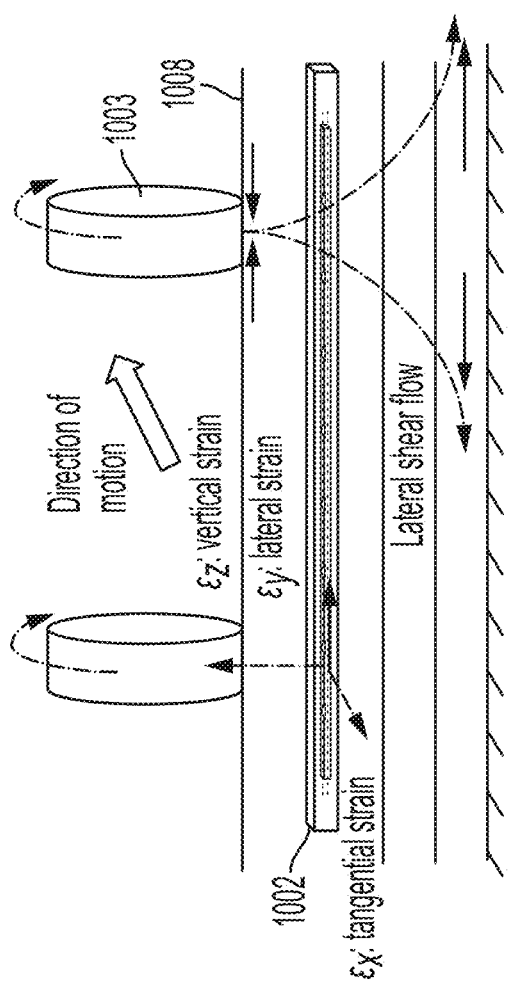

FIGS. 11A and 11B show additional details of the strain distributions of lateral fiber 1002 and longitudinal fiber 1012 shown in FIG. 10. FIG. 11A shows a vehicle 1005 moving along pavement 1008 within which a longitudinal fiber 1012 is embedded. As is illustrated in FIG. 11A, the axle load of the vehicle 1005 exerted on the pavement 1008 results in frictional forces that produce tangential strain, Ex, which is sensed by the optical sensors 1014 of the longitudinal fiber 1012.

When passing over or in proximity to the lateral fiber 1002 in the direction of motion indicated in FIG. 11B, three components of strain are generated by the axle load of the vehicle 1005 exerted on the pavement 1008; lateral strain $\varepsilon_y$, vertical strain $\varepsilon_z$, and tangential strain, $\varepsilon_x$. Of these strain components, lateral strain $\varepsilon_y$ is of particular interest and used for determining the location of wheels 1003 of vehicles passing by the lateral fiber 1002 and for determining an estimation of a vehicle's weight.

Figure 12A:
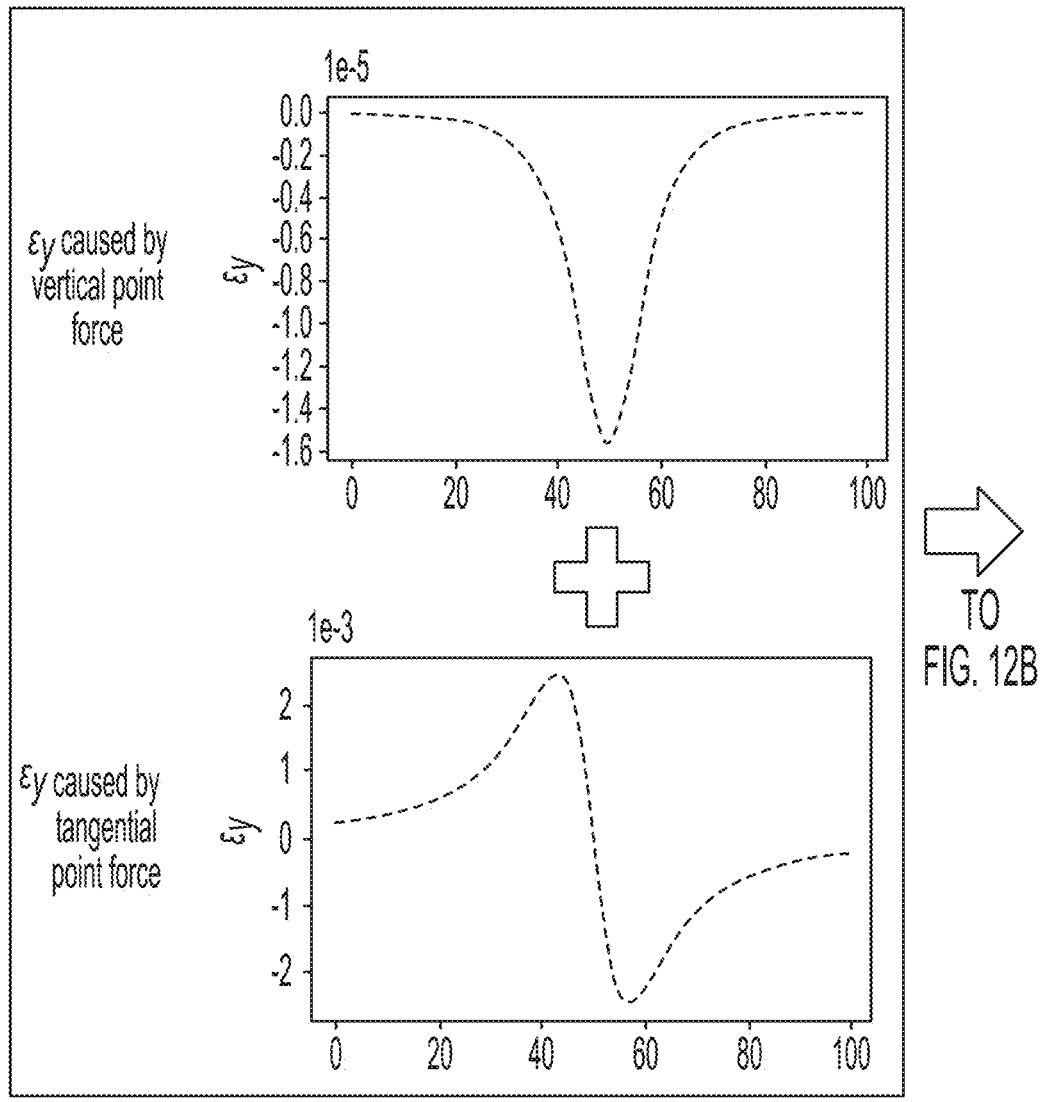
FIGS. 12A-12D illustrate lateral strain signals generated by optical sensors under the wheels and the introduction of random compressive or tensile strain superposition with the compressive strain introduced by the vehicle, which reduces the accuracy of weigh-in-motion applications.
Figure 12B:
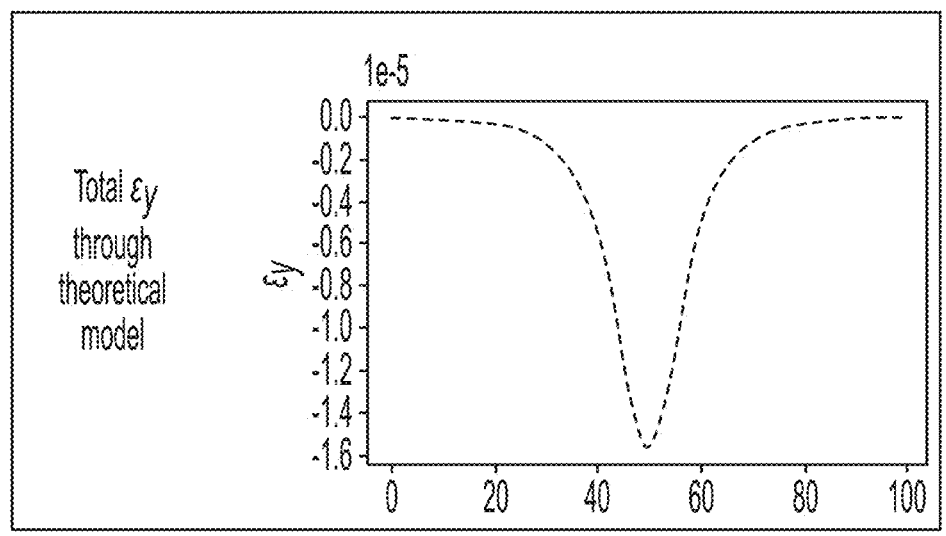
Figure 12B:
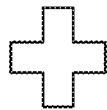
Figure 12B:
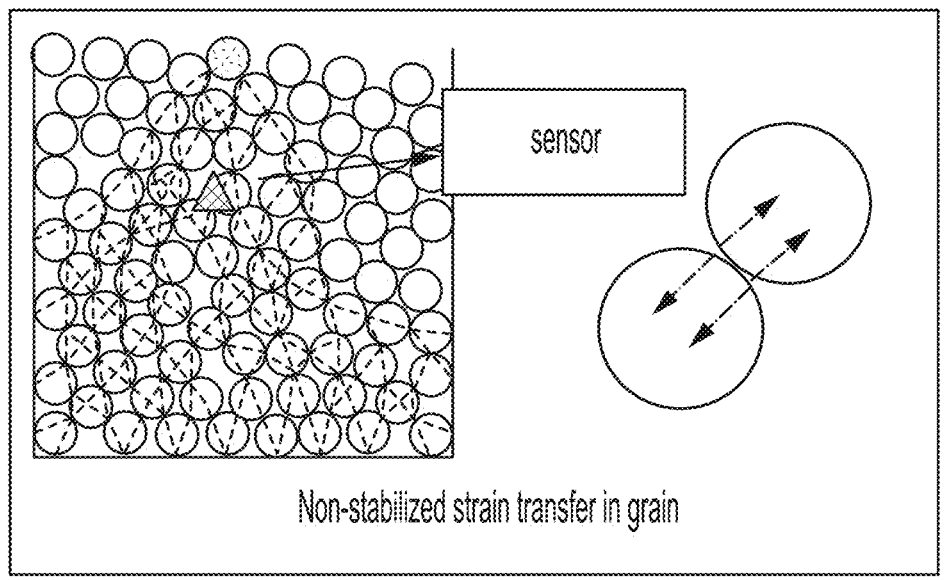
Figure 12C:
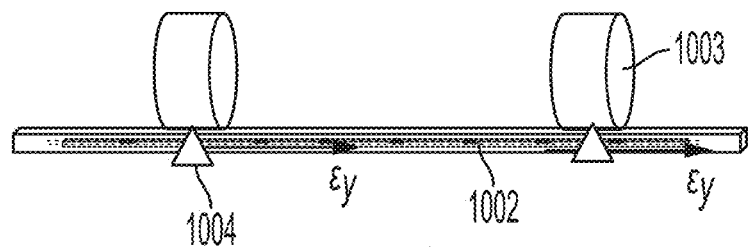
Figure 12D:
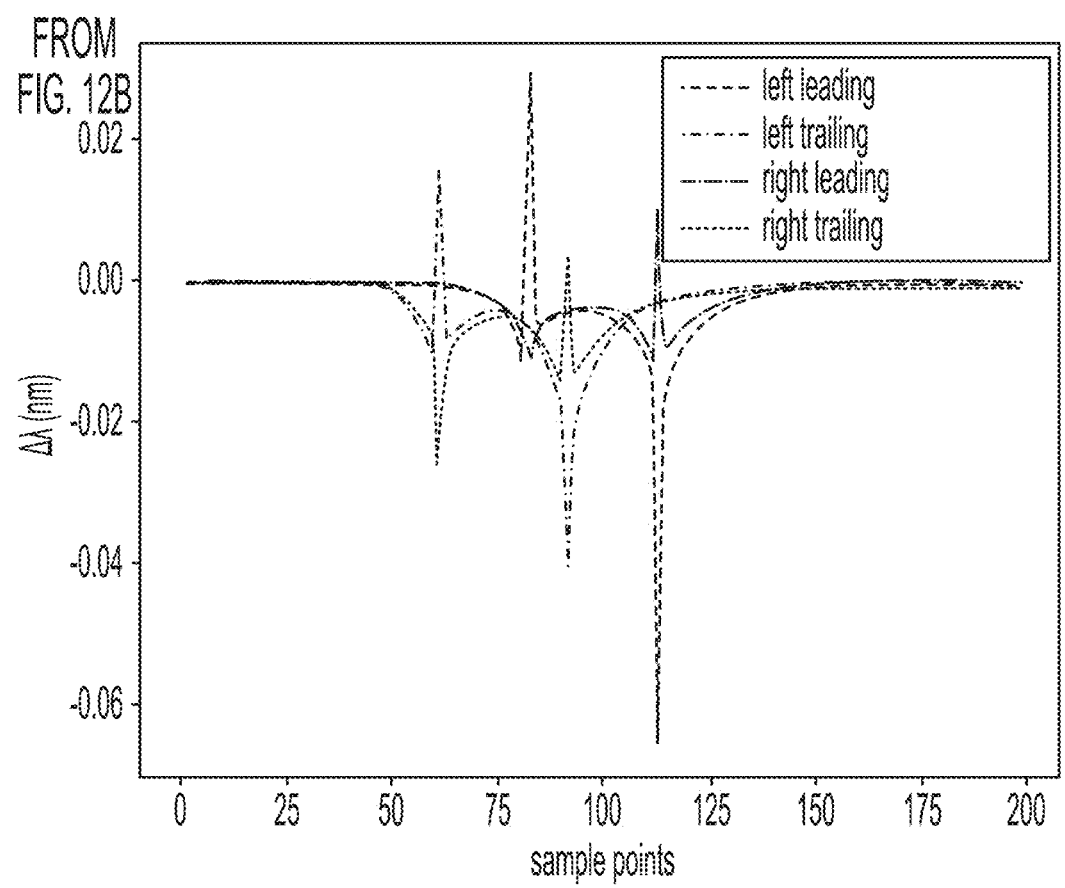

The inventors have identified a problem concerning the quality of lateral strain measurements that can be degraded due to various uncertainties. These uncertainties include tire types, types of friction, and materials inside the pavement 1008. According to a half-plane model, and with reference to FIGS. 12A-12D, the lateral strains under the wheels 1003 induced by a vertical point force due to the weight of the vehicle (see FIG. 12C) and a tangential force due to the friction force or braking force from the wheels 1003 exhibit a generally parabolic shape in the compression zone, as can be seen in FIGS. 12A and 12B. While the grain of the pavement/base layer under the repetitive loads can be in compression or tension, this scenario can induce non-stabilized strain transfer to the optical sensors. As a result, the optical sensors 1004 under the wheels (see FIG. 12C) can exhibit random compressive or tensile strain superposition with the compressive strain introduced by the vehicle (see FIG. 12D), which reduces the accuracy of weigh-in-motion applications. Embodiments of the disclosure overcome this problem and provide in-road, high-speed fiber optic system techniques that increase the accuracy of weigh-in-motion applications.

Figure 13:
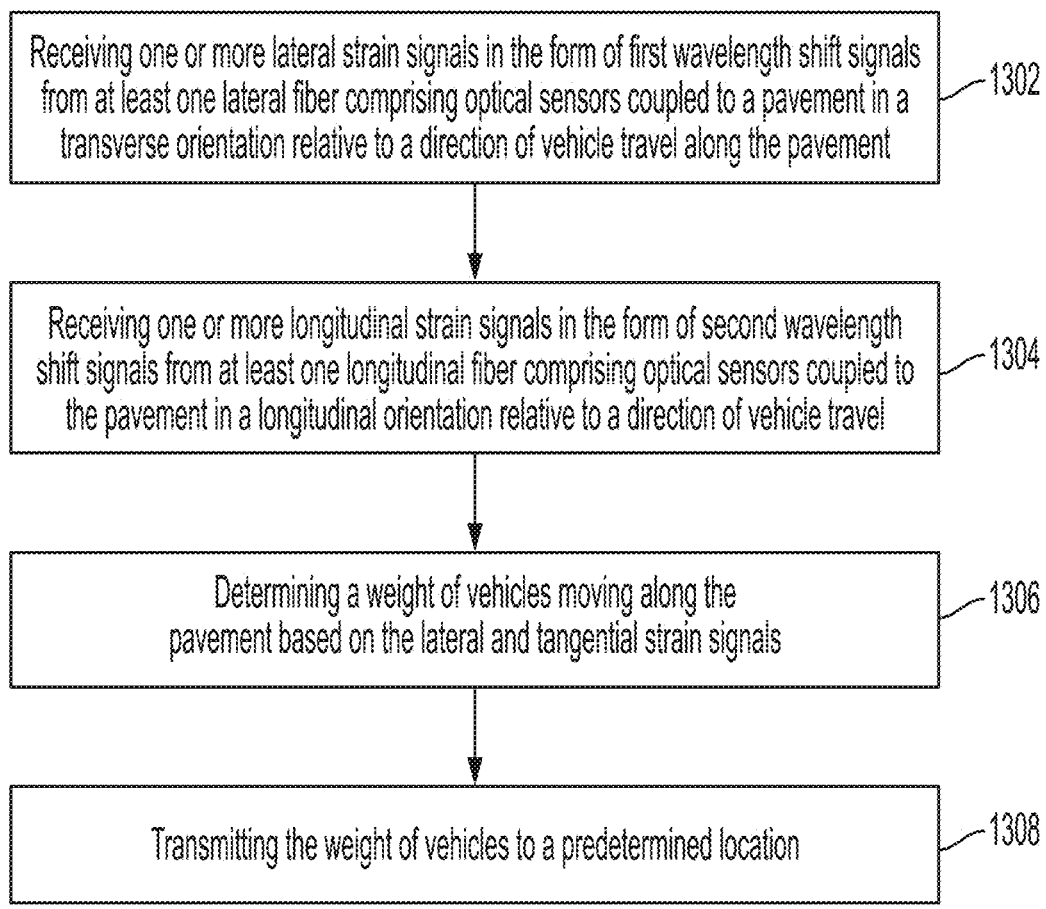
FIG. 13 illustrates a method for performing a high-speed weigh-in-motion application in accordance with various embodiments.

FIG. 13 illustrates a method for performing a high-speed WIM application in accordance with various embodiments. The method shown in FIG. 13 involves receiving 1302 one or more lateral strain signals in the form of first wavelength shift signals from at least one lateral fiber comprising optical sensors coupled to a pavement in a transverse orientation relative to a direction of vehicle travel along the pavement. The method also involves receiving 1304 one or more longitudinal strain signals in the form of second wavelength shift signals from at least one longitudinal fiber comprising optical sensors coupled to the pavement in a longitudinal orientation relative to a direction of vehicle travel. The method further involves determining 1306 a weight of vehicles moving along the pavement based on the lateral and tangential strain signals. The method can also involve transmitting 1308 the weight of the vehicle to a predetermined location, such as a database and/or an operator terminal.

Figure 14:
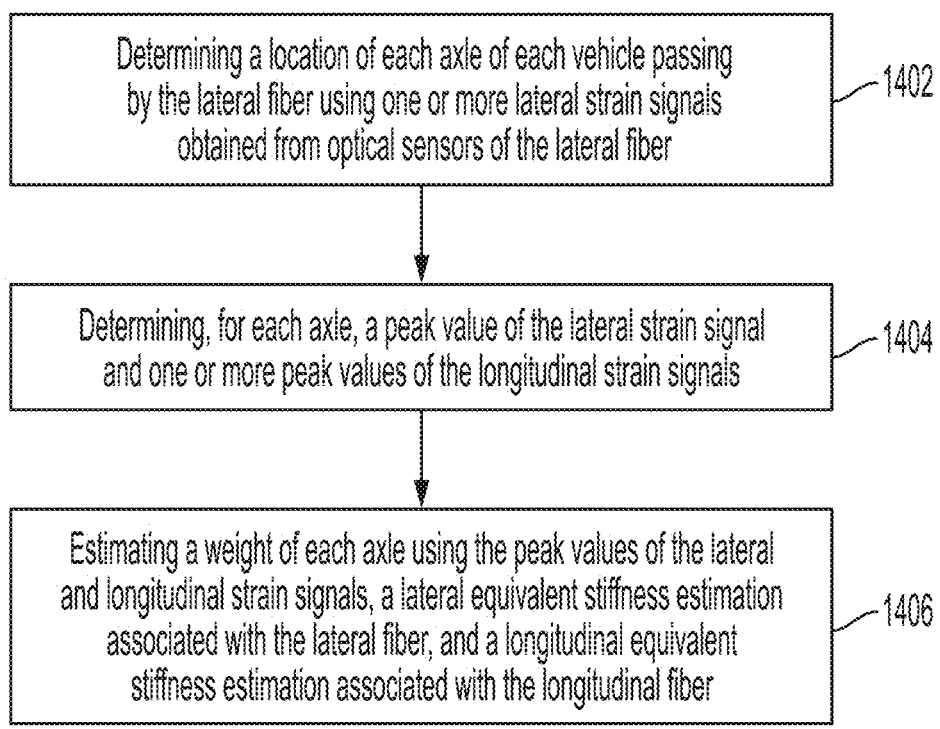
FIG. 14 illustrates a method for performing a high-speed weigh-in-motion application in accordance with various embodiments.

FIG. 14 illustrates a method for performing a high-speed WIM application in accordance with various embodiments. The method shown in FIG. 14 involves determining 1402 a location of each axle of each vehicle passing by the lateral fiber using one or more lateral strain signals obtained from optical sensors of the lateral fiber. The method also involves determining 1404, for each axle, a peak value of the lateral strain signal and one or more peak values of the longitudinal strain signals. The method further involves estimating 1406 a weight of each axle using the peak values of the lateral and longitudinal strain signals, a lateral equivalent stiffness estimation associated with the lateral fiber, and a longitudinal equivalent stiffness estimation associated with the longitudinal fiber.

Figure 15:
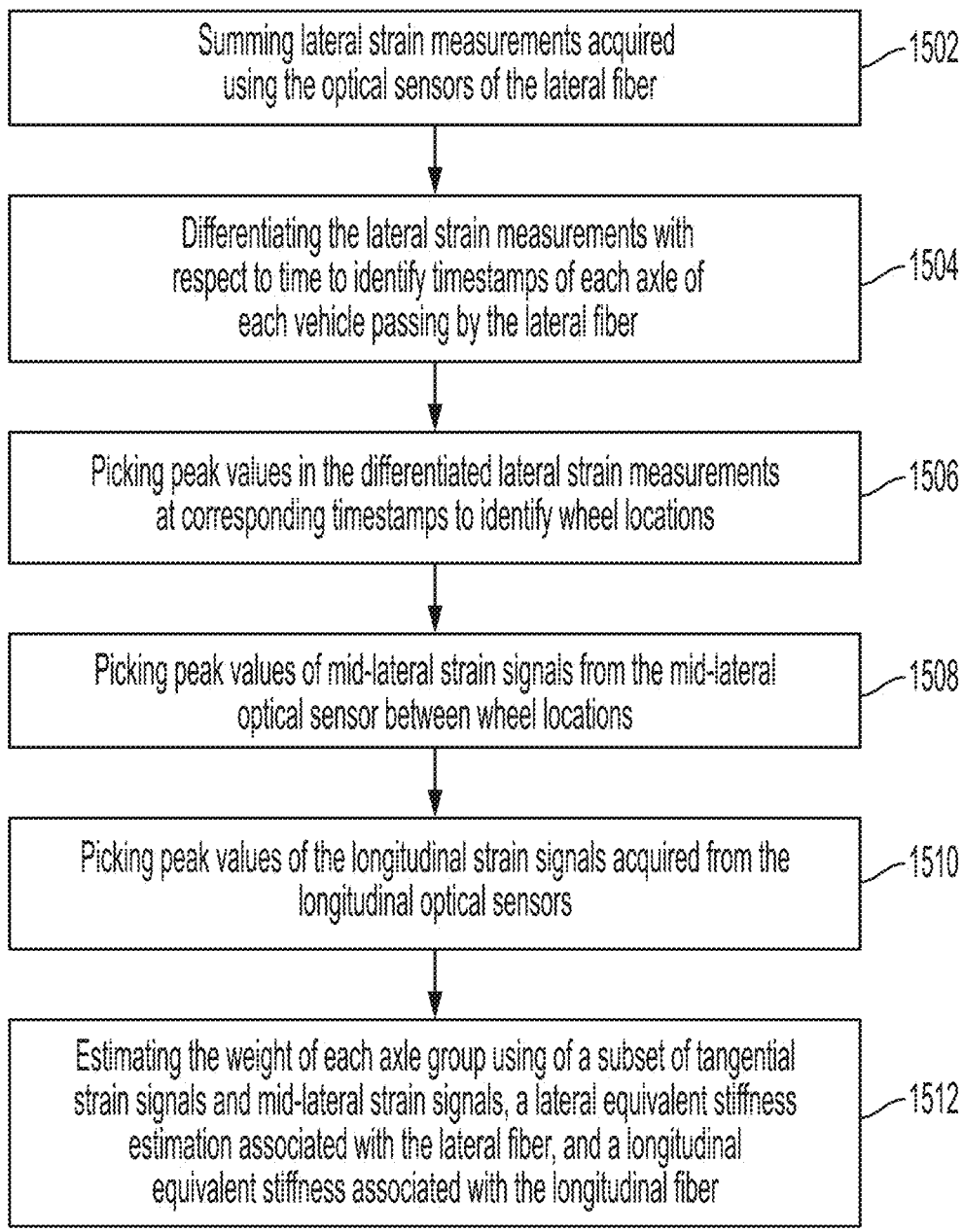
FIG. 15 illustrates a method for performing a high-speed weigh-in-motion application in accordance with various embodiments.

FIG. 15 illustrates a method for performing a high-speed WIM application in accordance with various embodiments. The method shown in FIG. 15 involves summing 1502 lateral strain measurements acquired using optical sensors of a lateral fiber. The method involves differentiating 1504 the lateral strain measurements with respect to time to identify timestamps of each axle of a vehicle passing by the lateral fiber. The method also involves picking 1506 peak values in the lateral strain measurements at corresponding timestamps to identify wheel locations. The method further involves picking 1508 peak values of mid-lateral strain signals acquired from a mid-lateral optical sensor between wheel locations. The method also involves picking 1510 peak values of the longitudinal strain signals acquired from the longitudinal optical sensors. The method further involves estimating 1512 the weight of each axle group using a subset of tangential strain signals and mid-lateral strain signals, a lateral equivalent stiffness estimation associated with the lateral fiber, and a longitudinal equivalent stiffness associated with the longitudinal fiber.

FIGS. 16A-1, 16A-2, 16A-3, 16B, and 16C illustrate a sensor network comprising lateral fiber sensors and longitudinal fiber sensors, and signals produced by such sensors in accordance with various embodiments. FIG. 16A-1 illustrates a sensor network embedded in road pavement in accordance with various embodiments. The sensor network 1600 comprises distributed fiber optic sensors embedded in pavement 1608 in a transverse direction (via lateral fiber 1602) and in a longitudinal direction (via longitudinal fiber 1612) to continuously sense vehicles moving above the sensor network 1600. In some implementations of the lateral fiber 1602, each lane can comprise at least ten sensors equally spaced perpendicular to the traffic direction inside one or more parallel trenches cut in the pavement 1608. A longitudinal fiber 1612 may be positioned inside a trench cut in the pavement 1608 and situated in the center of the lane in the traffic direction, with first and last sensors spaced apart by a distance of a few meters apart (e.g., 1-3$m$). In some implementations, the longitudinal fiber 1612 can include at least ten sensors equally spaced and parallel to the traffic direction. An advantage of situating the longitudinal fiber 1612 as shown in FIG. 16A-1 is that the mid of the lane experiences less repetitive wheel loads, which reduces the potential for fatigue damage to the longitudinal fiber 1612.

Figure 16B:
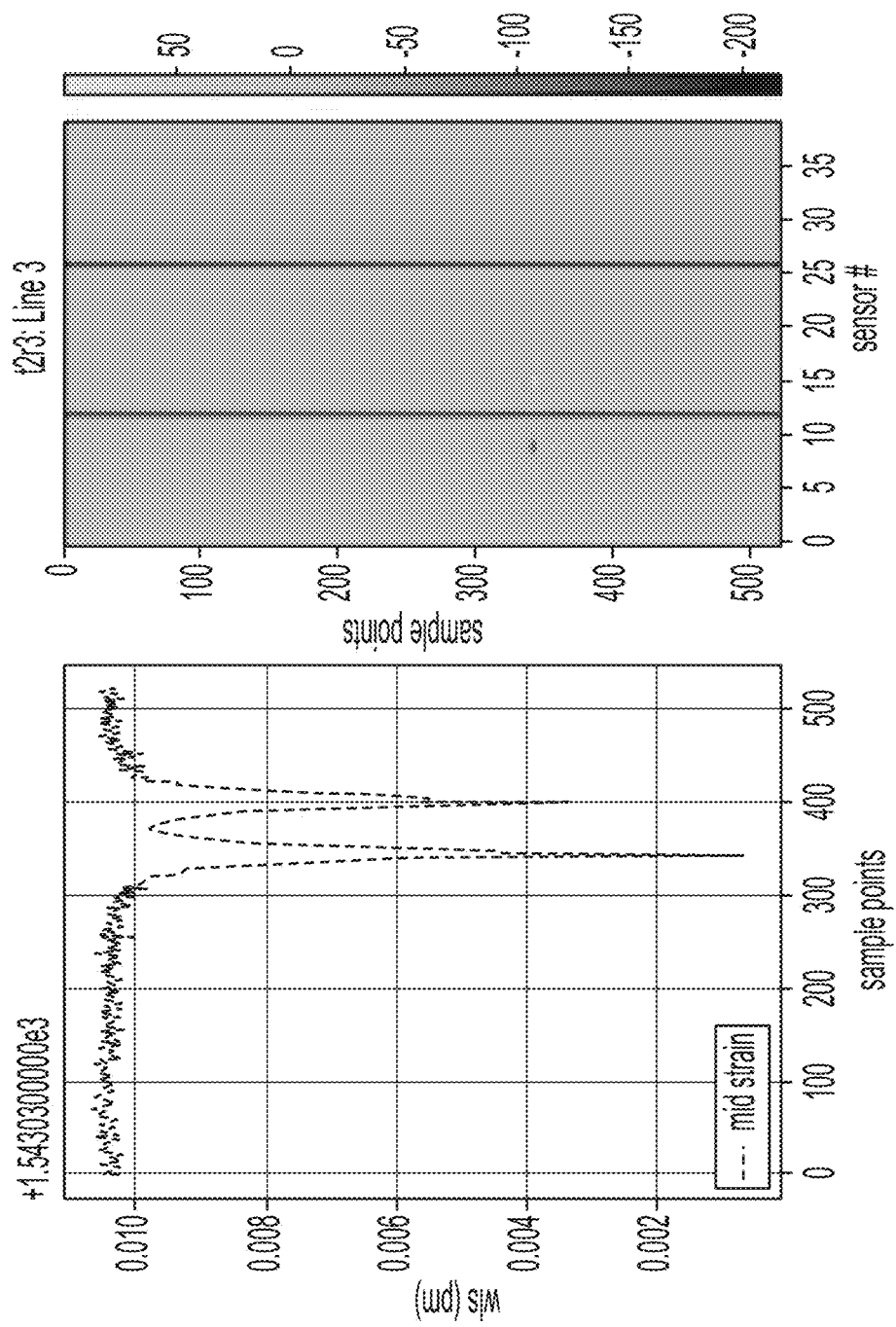
Figure 16C:
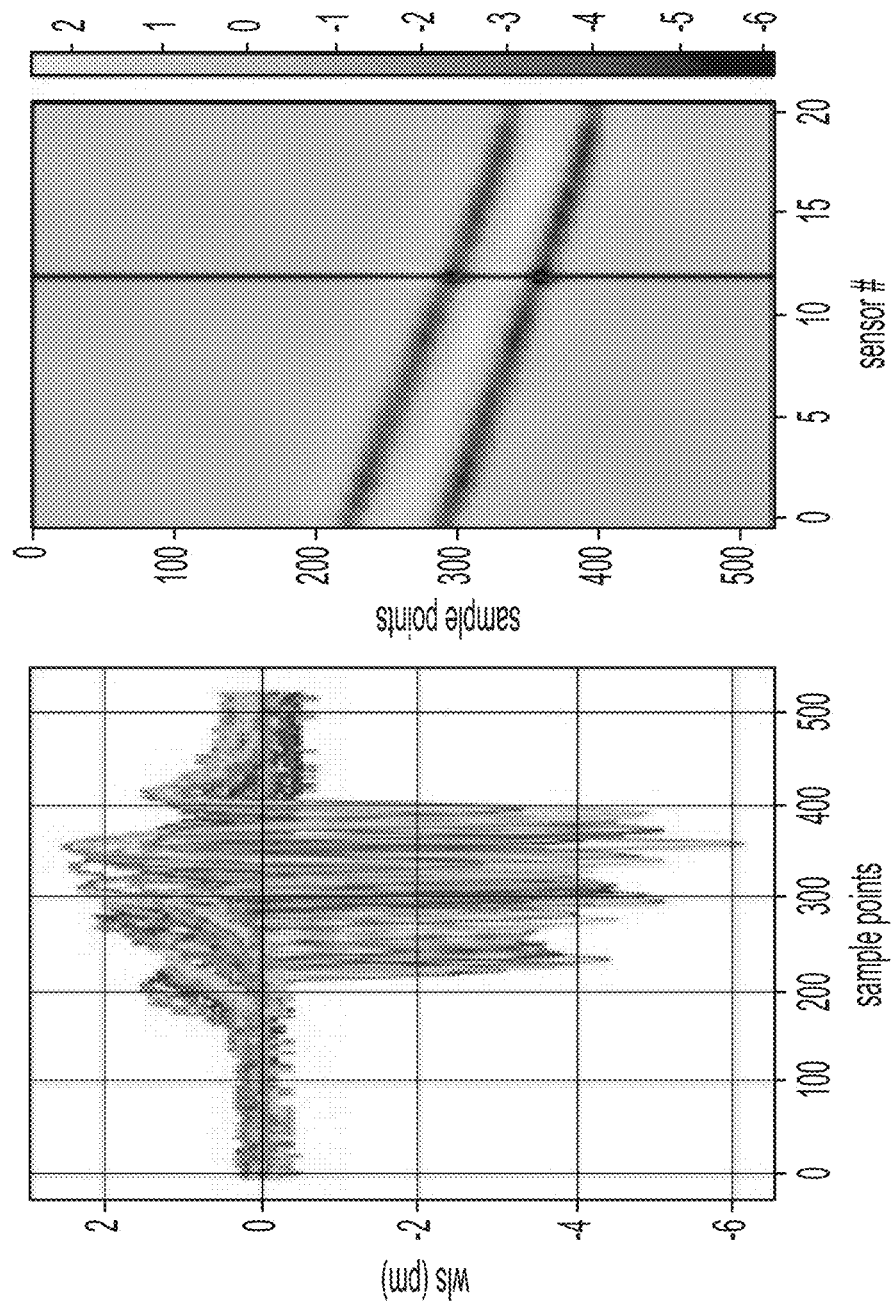

Vehicle wheels 1603 interact with the embedded fiber optic sensors in the lateral direction, via the lateral fiber 1602, and the longitudinal (traffic) direction, via the longitudinal fiber 1612, resulting in the production of pavement-induced deformation/strain signals as shown in FIGS. 16B and 16C, respectively. The spatio-temporal strain measurements produced from the distributed fiber optic sensors can be used for multi-modal traffic monitoring analysis (e.g., traffic volume, speed, and road occupancy) and vehicle attributes extraction (e.g., number of axles, axle groups, vehicle type, and axle weight).

The overall framework for the vehicle weight attributes extraction process in a lane is illustrated in FIGS. 17, 18A-18D, and 19A-19D. A first step of the process involves locating wheels and identifying a particular lateral sensor. The particular lateral sensor is referred to as the critical sensor, which is preferably the mid-lateral sensor. Lateral strain measurements acquired from the optical sensors of the lateral fiber 1602 are used to locate the wheel locations and identify the critical sensor (e.g., mid-lateral sensor) to extract the events. It has been determined by the inventors that using lateral strain measurements acquired from a mid-lateral sensor advantageously increases the accuracy of weigh-in-motion applications by avoiding the use of optical sensors under the wheels (see FIG. 12C), which can exhibit random compressive or tensile strain superposition with the compressive strain introduced by the vehicle.

Figure 17:
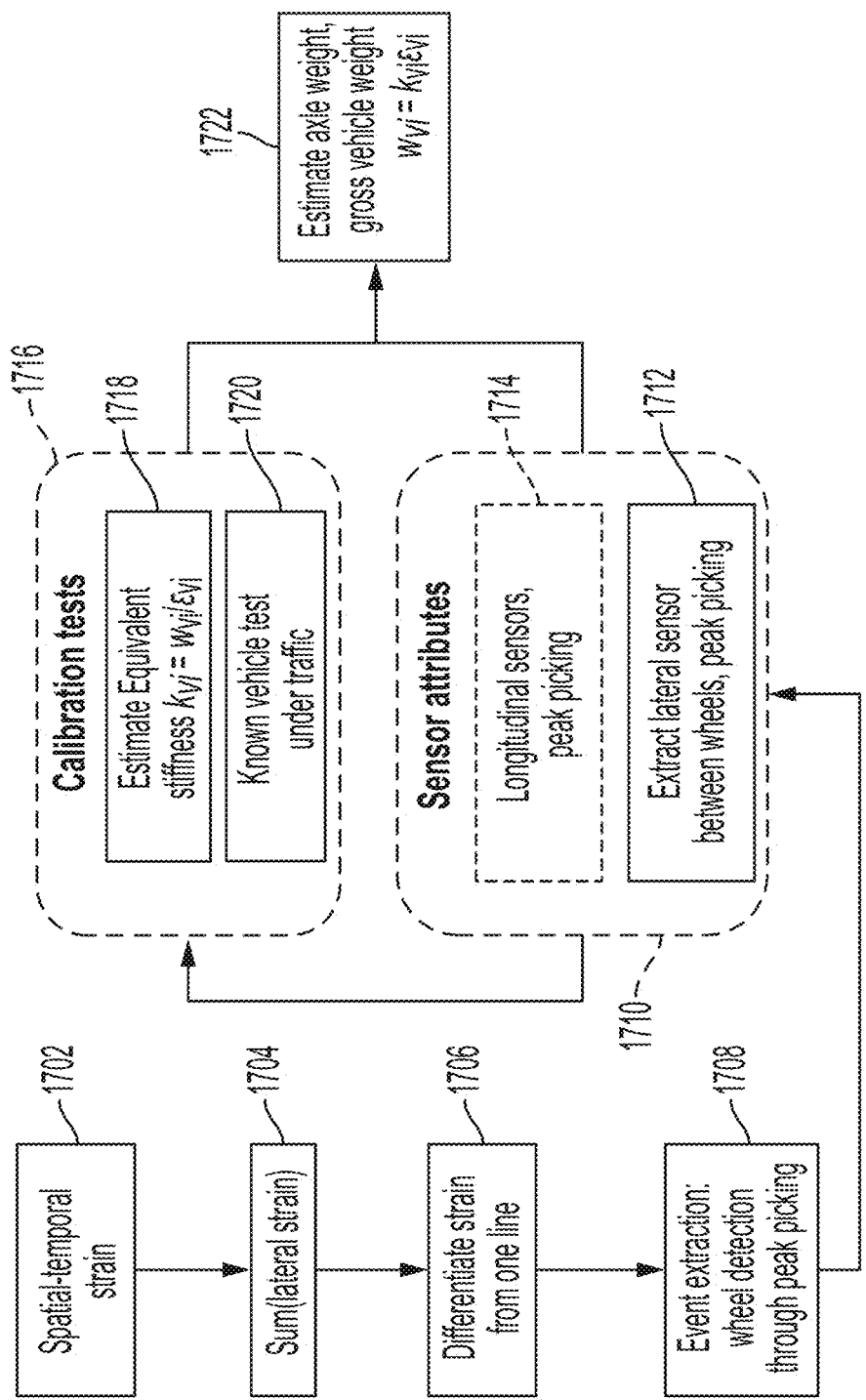
FIG. 17 illustrates an overall framework for a vehicle weight attributes extraction process in a lane according to various embodiments.
Figure 18A:
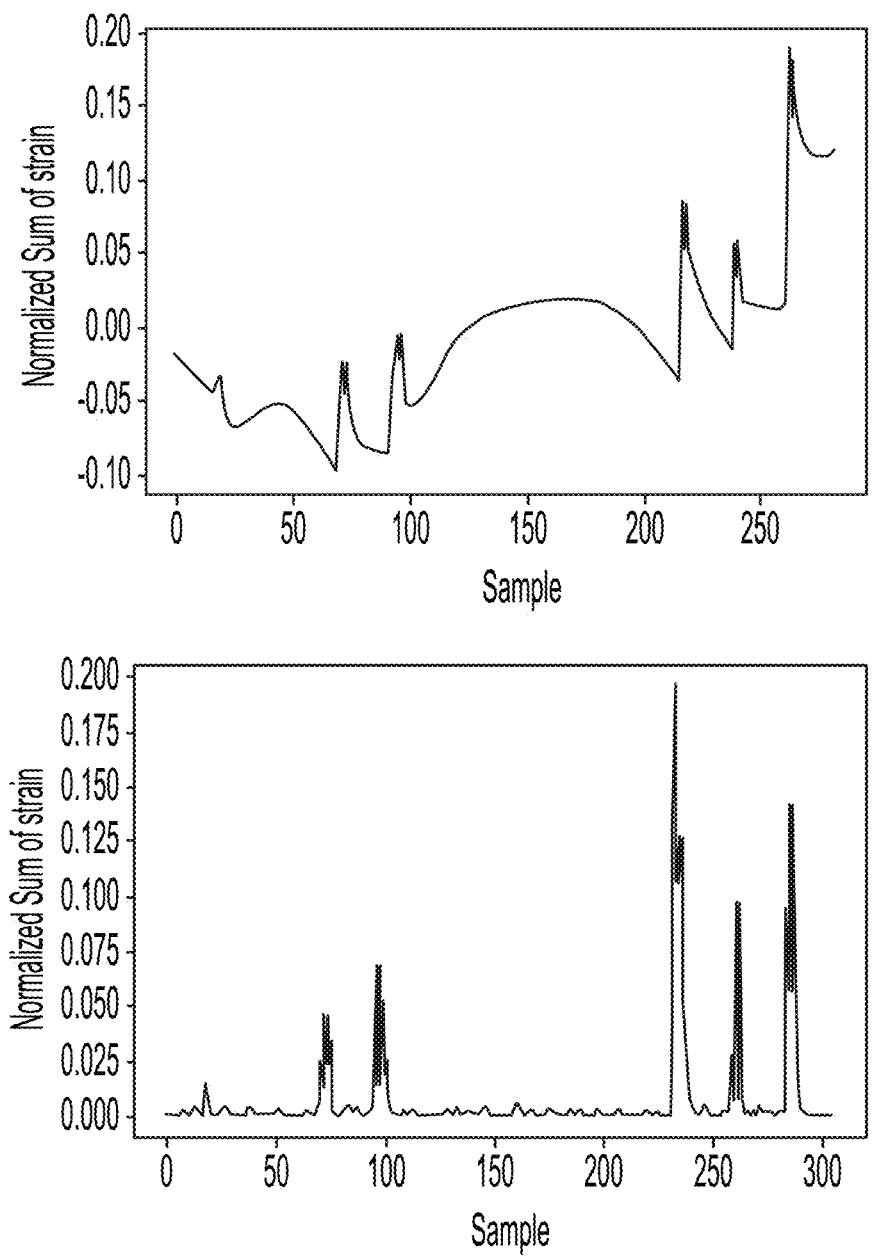
FIGS. 18A-18D illustrate lateral strain signals and processing of same according to the framework shown in FIG. 17.
Figure 18B:
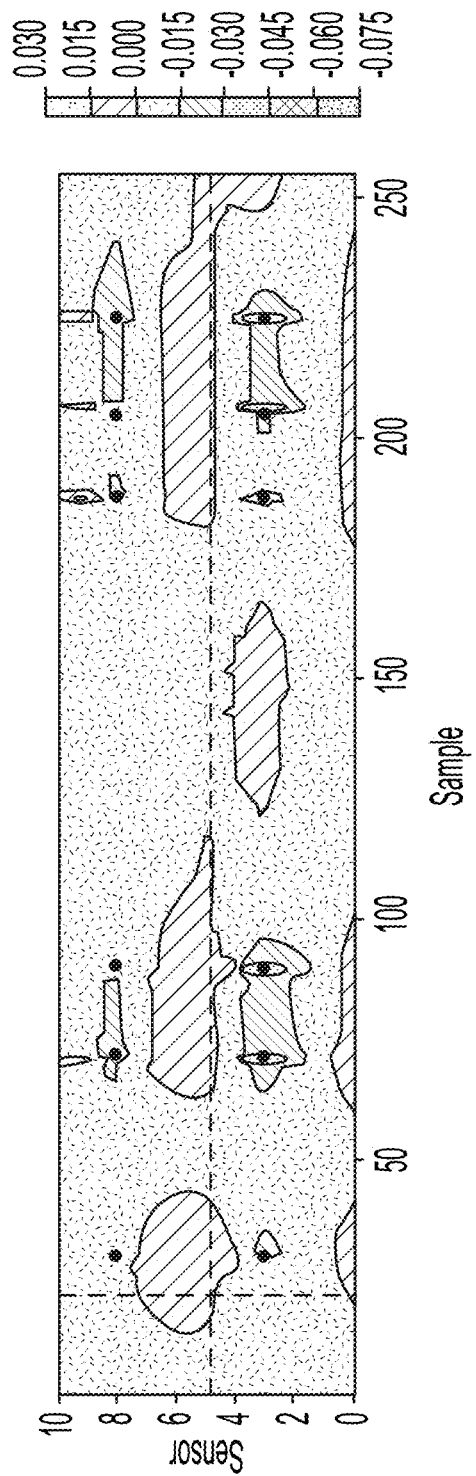
Figure 18C:
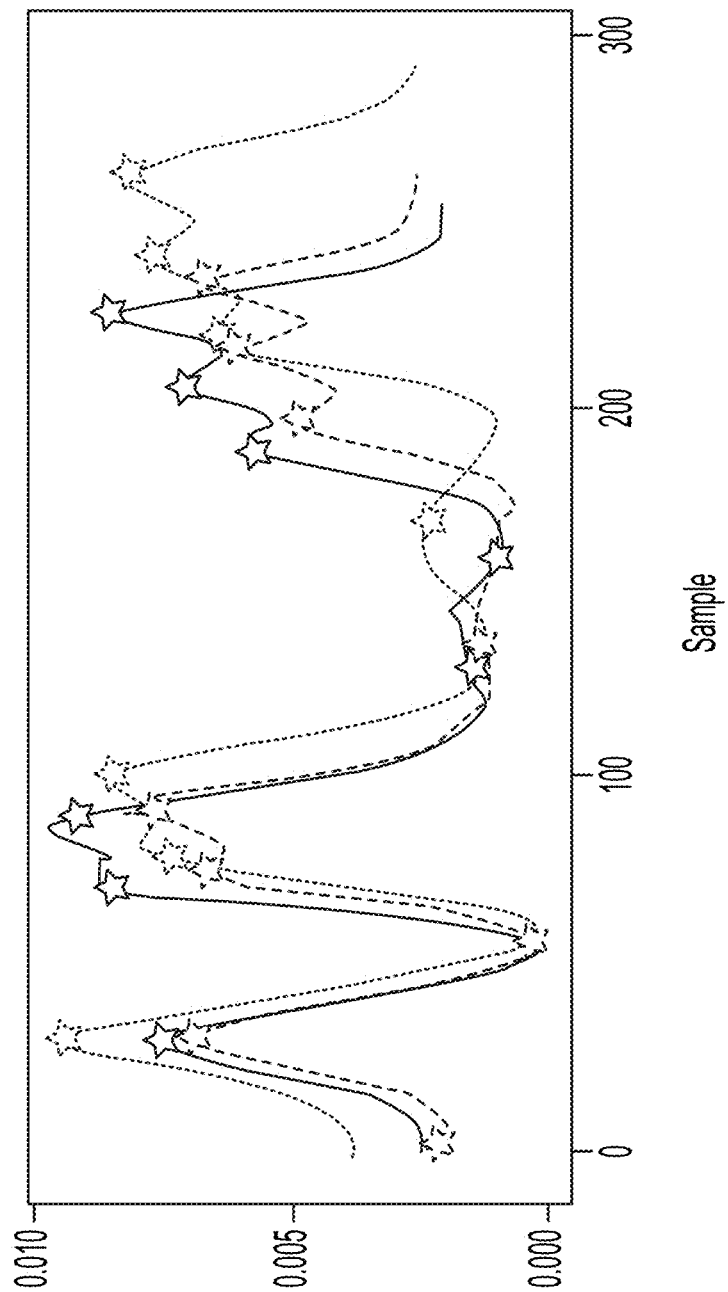
Figure 18D:
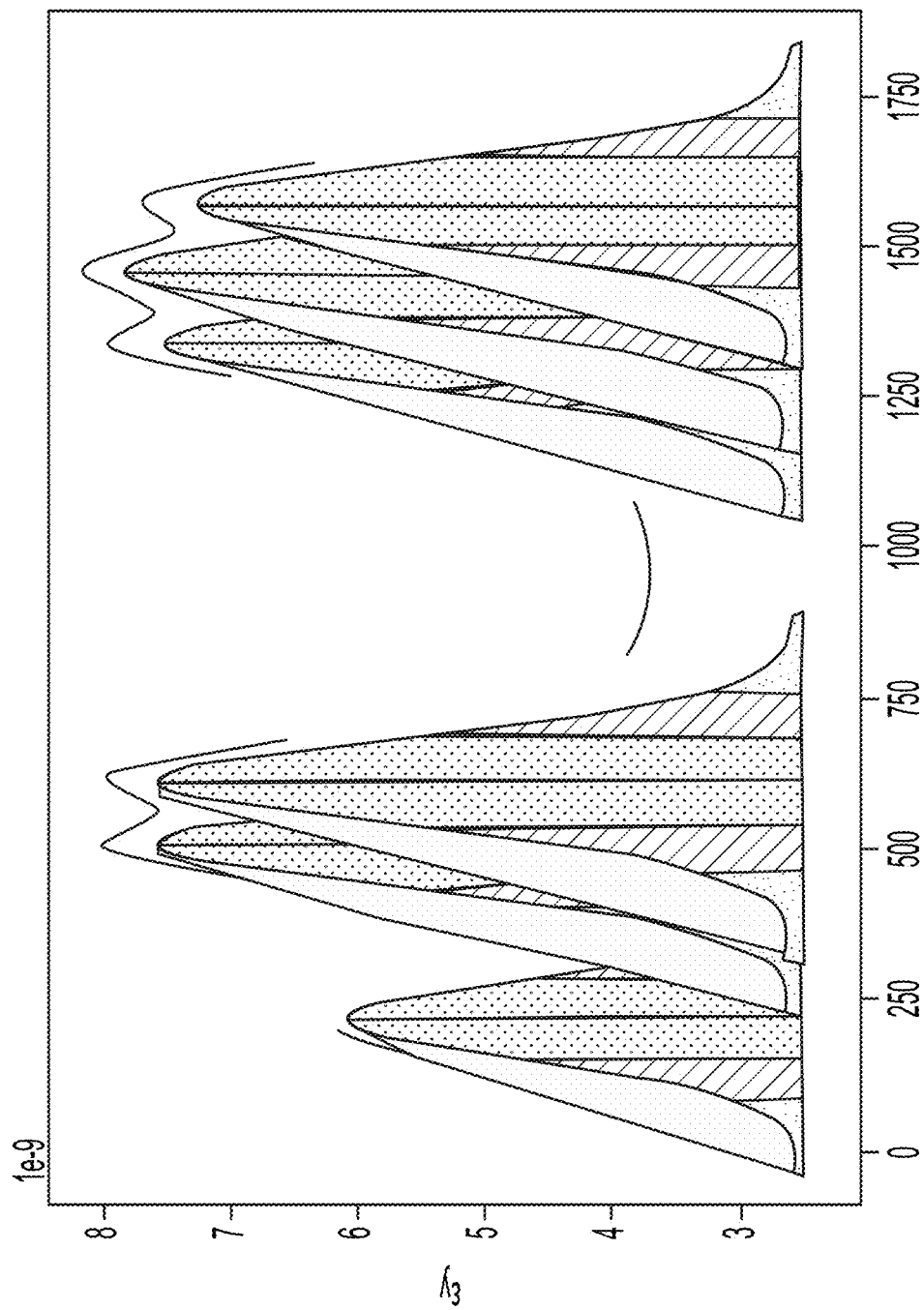

The first step (Step 1) of the processes shown in FIG. 17 involves obtaining 1702 spatio-temporal strain measurements (see, e.g., FIG. 18A) using the optical sensors of the lateral fiber 1602. Spatio-temporal strain measurements are also obtained using the optical sensors of the longitudinal fiber 1612. The process involves summing 1704 the lateral strain measurements acquired using optical sensors of a lateral fiber 1602 (FIG. 18A, left panel). The process also involves differentiating 1706 the lateral strain measurements with respect to time (FIG. 18A, right panel) to identify timestamps for each axle of the vehicle passing by the lateral fiber 1602 (see, e.g., FIG. 18B). When timestamps of each of the axles are registered, peak picking is conducted in the lateral strain measurements at the corresponding timestamps to determine 1708 the locations of the wheels 1603. A segment of the whole event is extracted (see, e.g., FIG. 18C, noting that this figure shows three sets of data corresponding to three traversals over the lateral fiber 1602 by the same vehicle). These steps are performed continuously on the streaming data.

The processes of FIG. 17 also involve obtaining sensor attributes 1710. The sensor attributes 1710 include lateral sensor attributes 1712 and longitudinal sensor attributes 1710. Attributes obtained from the mid-lateral sensor of the lateral fiber 1602 and sensors of the longitudinal fiber 1612 include peak height for each axle and the area under the curve for each axle group (see FIGS. 18C and 18D). The sensor attributes 1710 are used together with values of estimated equivalent stiffness 1718 from calibration tests 1716 to estimate 1722 axle weight and gross vehicle weight.

The second step (Step 2) of the processes shown in FIG. 17 involves the estimation of equivalent stiffness 1718 through use of control vehicle tests 1720. Equivalent stiffness can be defined as the ratio between the axle group weight and the height of the super-imposed signals of the same axle group from the critical sensor. To obtain the equivalent stiffness, different classes of vehicles with known axle weights are arranged to pass the sensing network 1600, and the events are extracted based on the critical sensor from Step 1.

Sensor attributes can be correlated via calibrations tests 1716 to the known weight of test vehicles. Different test vehicles of known weight can be driven across the sensor network 1600, and sensor attributes can be obtained for the test vehicles to determine coefficients ($k_{vi}$). For example, the height of the sensor signal peak acquired from the critical sensor can be determined for each axle. Also, the area under the curve of super-imposed signals of the same axle group can be determined. These sensor attributes can be correlated to the known weight of the test vehicles to determine coefficients ($k_{vi}$). During continuous monitoring, the coefficients ($k_{vi}$) and the sensor attributes ($\varepsilon_{vi}$) are multiplied to estimate 1722 the weight ($w_{vi}$) of the vehicle (e.g., by axle group weight and/or gross weight).

The wheel trajectory from each axle has a wide distribution. When the vehicle speed is low, distinct axle configurations can be manifested on the strain response signal. When the vehicle speed is high, as is the case in FIG. 18D, the axle group of adjacent axles can have overlapped wheel trajectory distributions. For a high-speed WIM system, the equivalent stiffness of each axle group is introduced to measure the relationship between axle group weight with super-imposed axle height and area under curves from the critical sensor (e.g., mid-lateral optical sensor) of the lateral fiber 1602 and optical sensors of the longitudinal fiber 1612 between the wheels 1603. It can be appreciated that the processes of Step 1 using mid-lateral sensors to locate the wheels 1603 reduces the error propagation for equivalent stiffness estimations by avoiding the use of non-stabilized strain transferred signals.

Figure 19A:
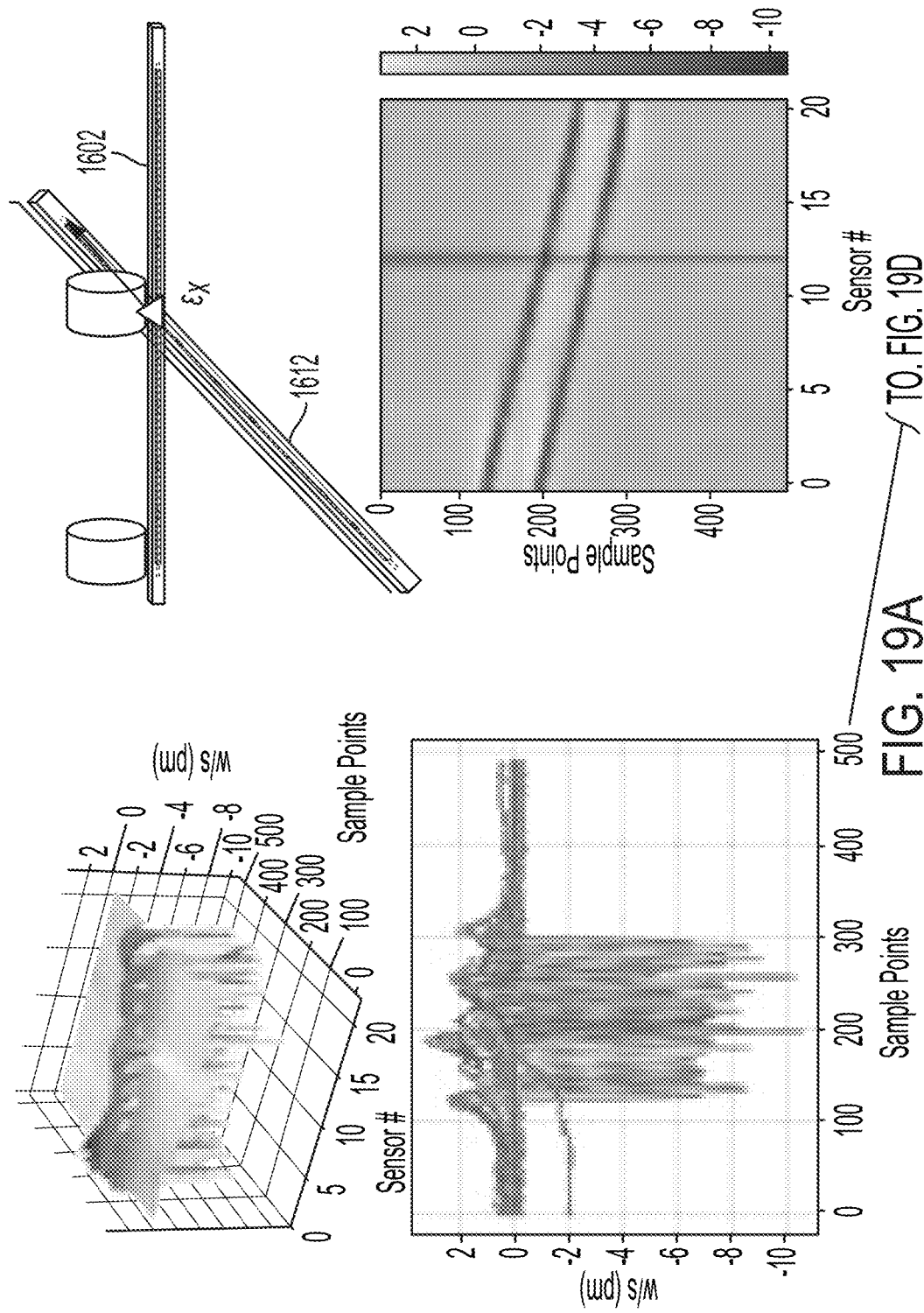
Figure 19C:
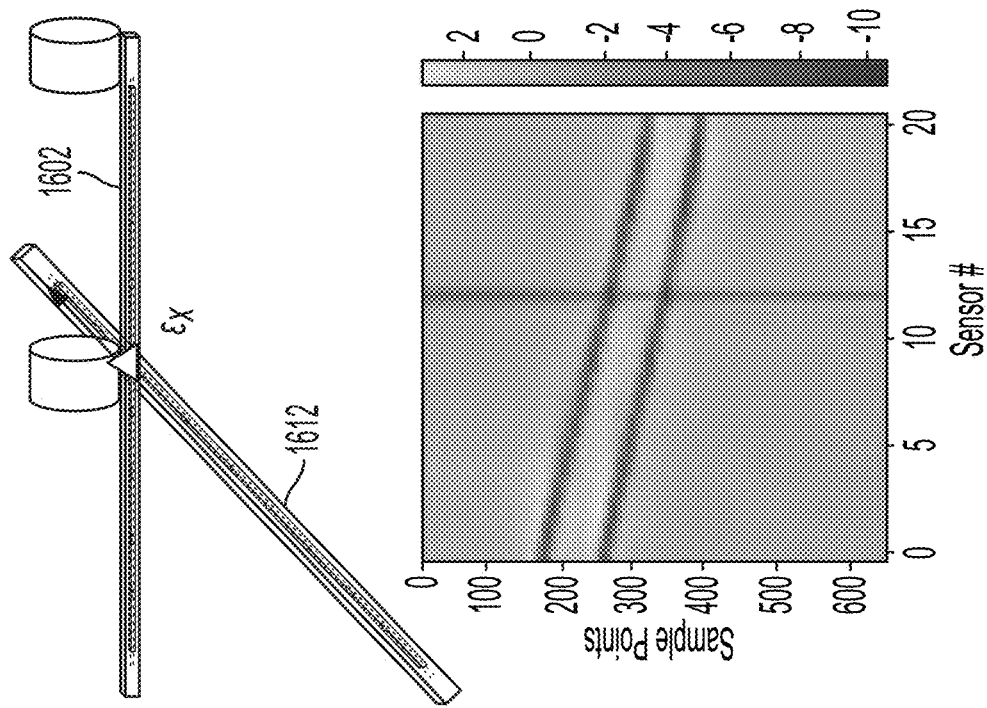
Figure 19C:
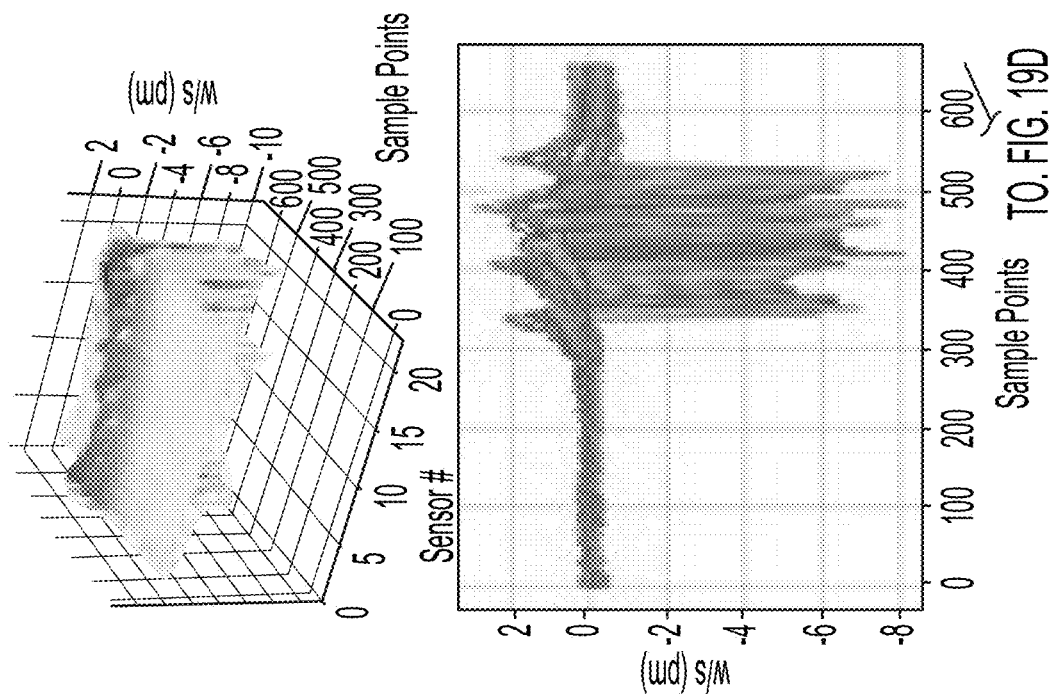
Figure 19D:
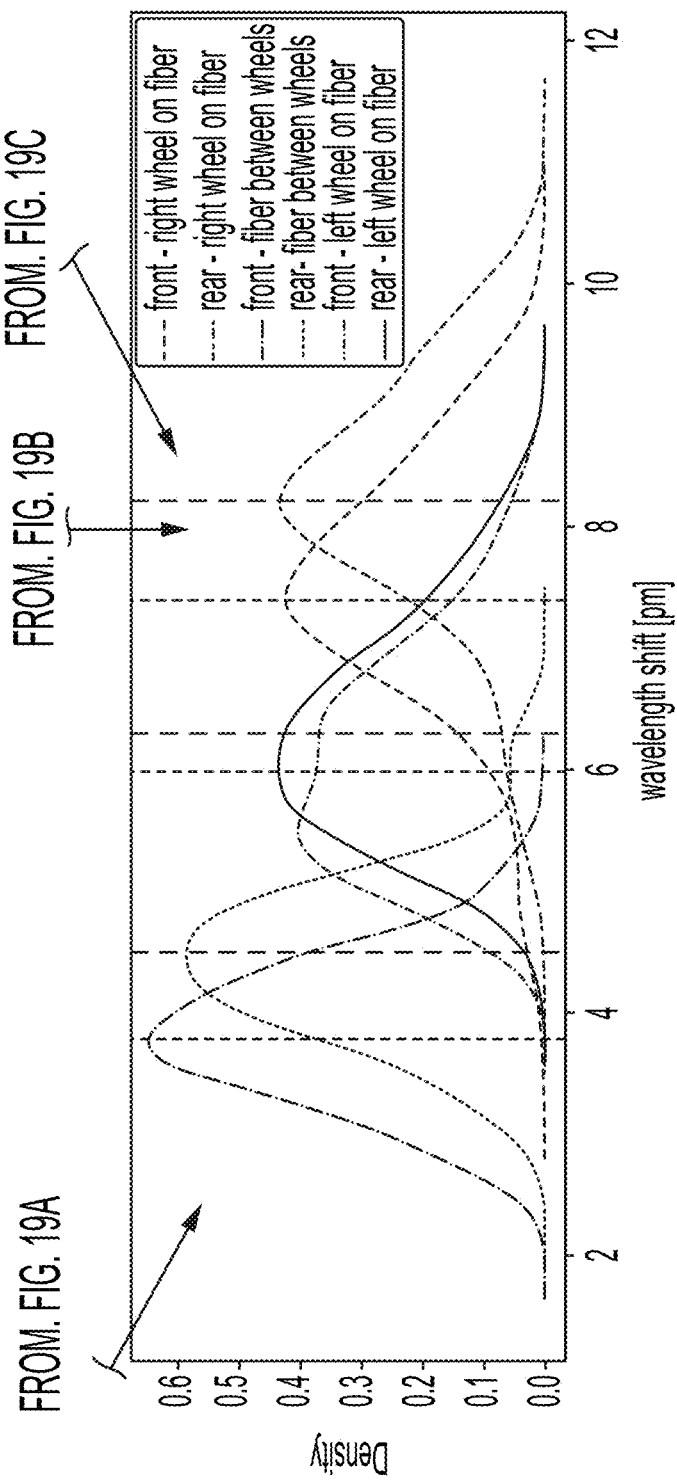
FIG. 19D illustrates tangential strain signals resulting from the wheel location scenarios shown in FIGS. 19A-19C.

In the case of the longitudinal fiber 1612, the longitudinal equivalent stiffness will vary for different wheel locations in the lateral direction as shown in FIG. 19D. FIG. 19A shows the scenario where the right wheel is located directly above the longitudinal fiber 1612. FIG. 19B shows the scenario where the right and left wheels are straddling the longitudinal fiber 1612. FIG. 19C shows the scenario where the left wheel is located directly above the longitudinal fiber 1612. A distance coefficient can be determined by locating the wheel locations (e.g., as determined from lateral strain measurements) to calibrate the longitudinal equivalent stiffness. A regression model between the ratio of the distance coefficients and the longitudinal equivalent stiffness can be generated from the control vehicle tests. As can be seen in FIG. 19D, stable tangential strain signals can be obtained from the sensors of the longitudinal fiber 1612. After identifying the wheel locations using the lateral strain measurements, the distance coefficients can be combined with the longitudinal equivalent stiffness to estimate the axial group weight of the vehicle using the tangential strain measurements.

The third step (Step 3) of the processes shown in FIG. 17 involves continuous weight estimation during the implementation phase in the field. The event extraction process from Step 1 is conducted continuously on spatial-temporal sensor data. The equivalent stiffness obtained from the controlled load test in Step 2 estimates the axle group weight using a regression model between the wheel axle signal features (e.g., super-imposed signal amplitude and area under the curve). In the case of the longitudinal fiber 1612, distance coefficients are obtained from Step 1 and the axle group weight can be estimated through the longitudinal equivalent stiffness from Step 2. Other attributes such as vehicle speed can also be obtained through sensors with a large separation distance (e.g., 1-3 m) either from parallel lateral fibers 1602 or from the two spaced-apart sensors (e.g., sensors at the ends) of a longitudinal fiber 1612 in a manner described above.

Figure 20A:
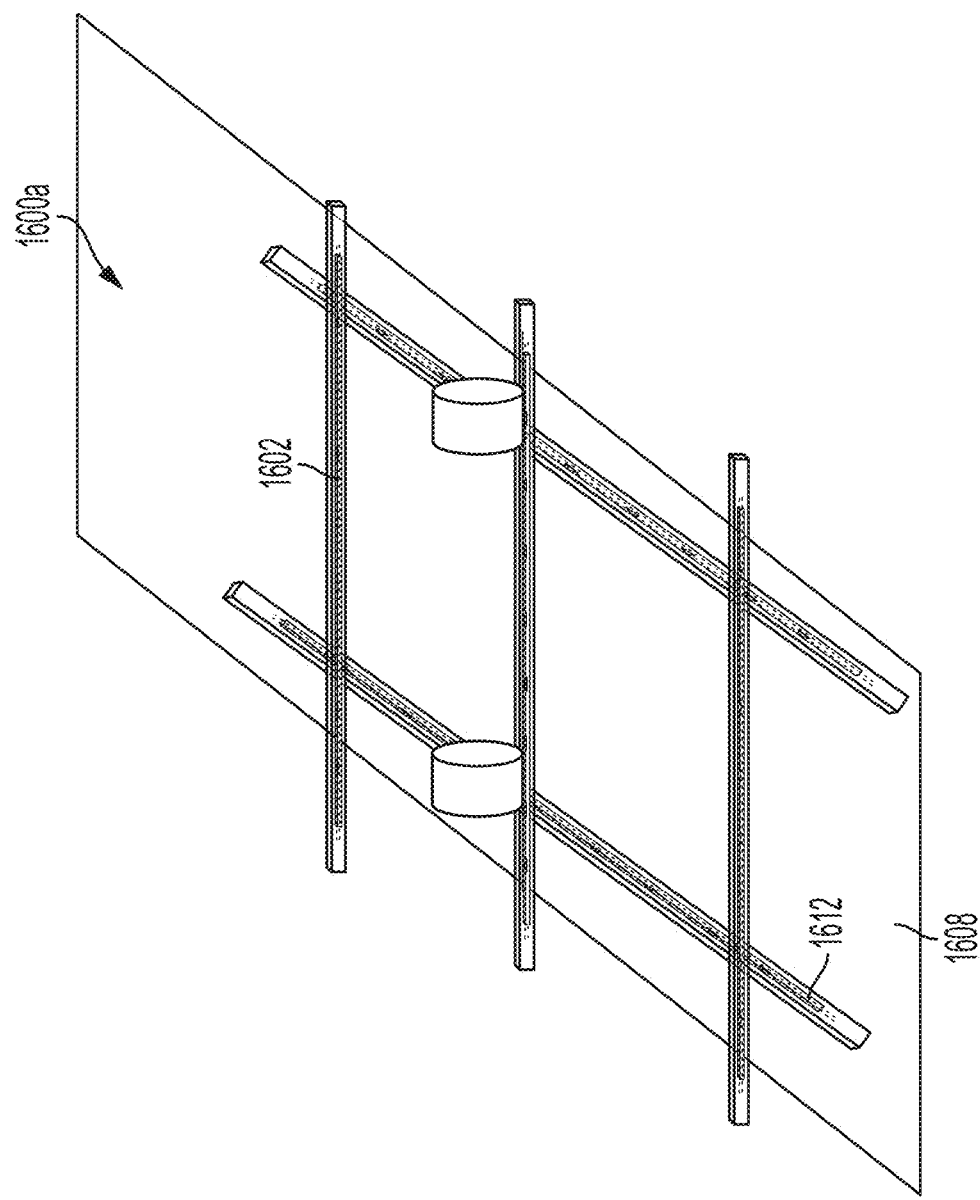
FIGS. 20A-20C illustrate a variety of network sensor configurations comprising different configurations and orientations of lateral and longitudinal fibers in accordance with various embodiments.
Figure 20B:
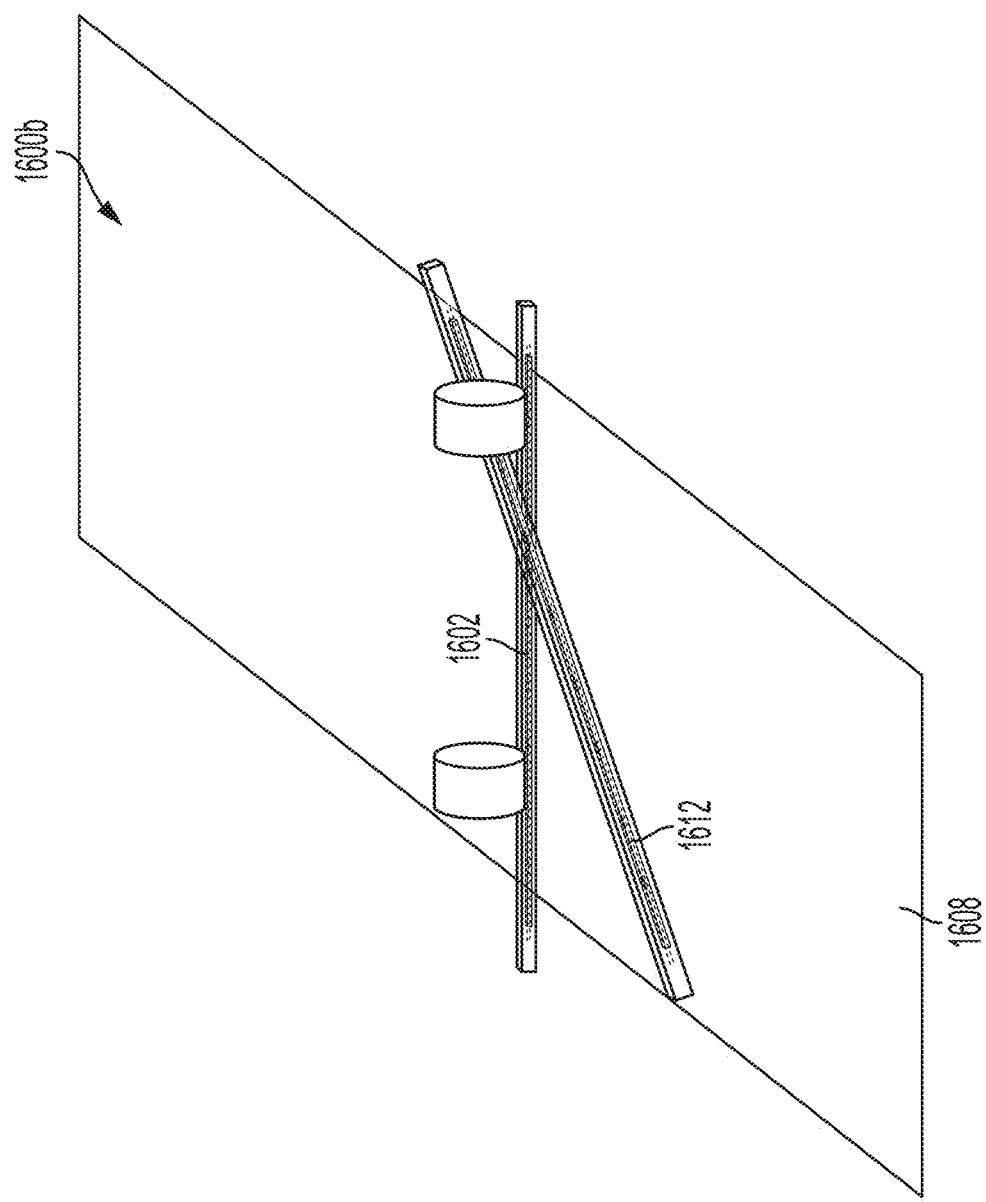
Figure 20C:
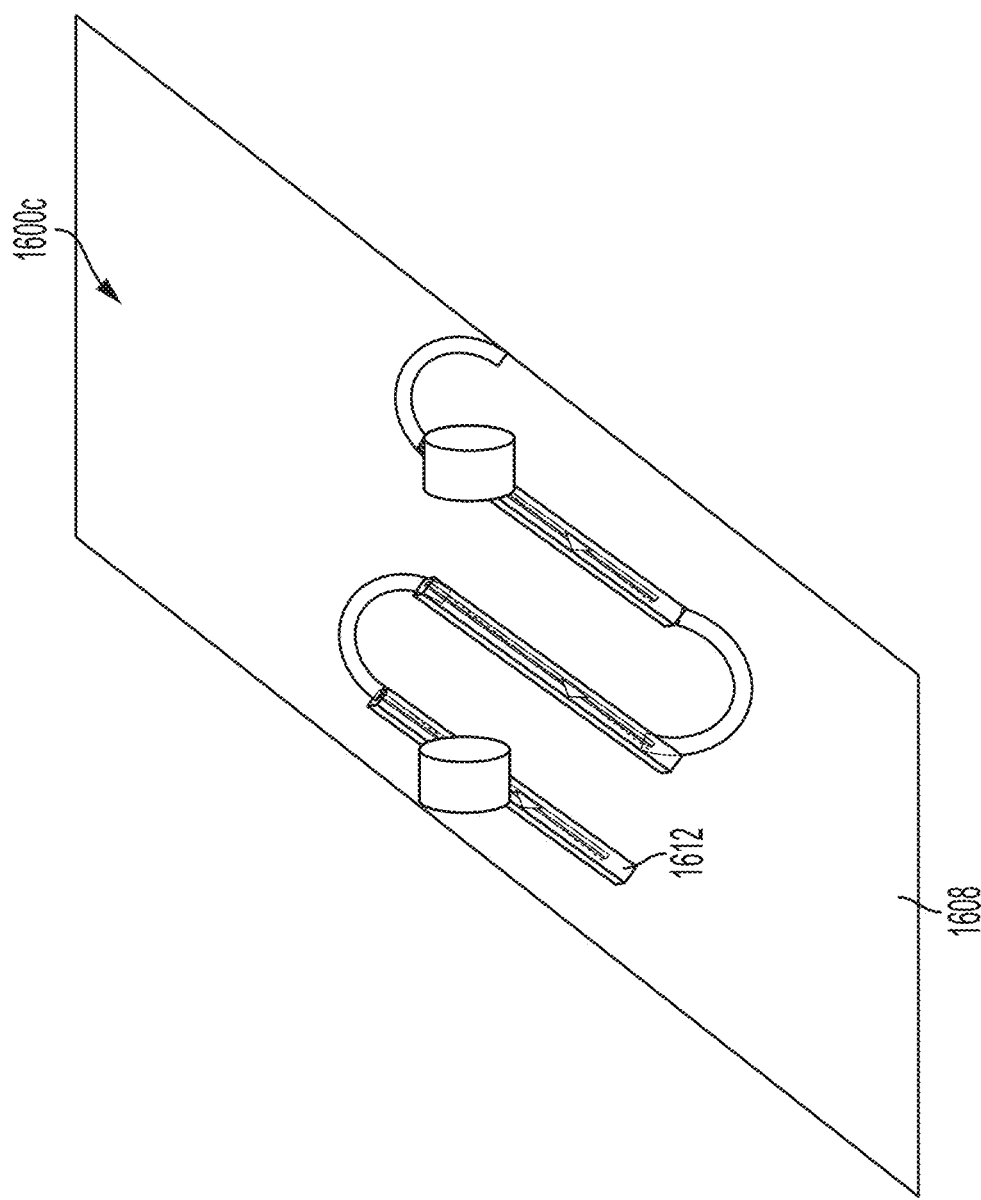

In the embodiments discussed above, reference has been made generally to sensor networks having a configuration shown in FIGS. 10 and 16A. It is to be understood that other sensor network configurations can be used, such as those shown in FIGS. 20A-20C. For example, the sensor network 1600*a* shown in FIG. 20A includes a multiplicity of lateral fibers 1602 and a multiplicity of longitudinal fibers 1612. As shown, the longitudinal fibers 1612 are biased toward the left and right edges of the pavement 1608, rather than the center of the lane. The sensor network 1600*b* shown in FIG. 20B includes a lateral fiber 1602 and a longitudinal fiber 1612 oriented at an angle relative to the direction of traffic. In this configuration, the longitudinal fiber 1612 is not oriented normal to the lateral fiber 1602 (e.g., oriented at an angle of between 10 and 80 degrees relative to the lateral fiber 1602). The sensor network 1600*c* shown in FIG. 20C includes a multiplicity (e.g., 3 or more) longitudinal fibers 1612.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A system, comprising:
 a sensor network comprising:
  at least one lateral fiber comprising optical sensors coupled to a pavement in a transverse orientation relative to a direction of vehicle travel along the pavement;
  at least one longitudinal fiber comprising optical sensors coupled to the pavement in a longitudinal orientation relative to the direction of vehicle travel;
  the optical sensors configured to produce wavelength shift signals comprising one or more lateral strain signals associated with the lateral fiber and one or more tangential strain signals associated with the at least one longitudinal fiber;
 a processor operatively coupled to the sensor network and configured to determine a weight of vehicles moving along the pavement based on the lateral and tangential strain signals; and
 a transmitter operatively coupled to the processor and configured to transmit the weight of vehicles to a predetermined location.

2. The system of claim 1, wherein the at least one longitudinal fiber is positioned along a center of a lane of the pavement.

3. The system of claim 1, wherein the at least one longitudinal fiber is positioned along a lane of the pavement at an angle relative to the direction of vehicle travel.

4. The system of claim 1, wherein the one or more longitudinal fibers comprises a plurality of longitudinal fibers and wherein the plurality of longitudinal fibers are positioned within a lane of the pavement.

5. The system of claim 1, wherein at least one optical sensor of the lateral fiber is positioned on the pavement a predetermined distance from at least one optical sensor of the at least one longitudinal fiber.

6. The system of claim 1, wherein the processor is configured to:
 produce spatial-temporal strain measurements based on the lateral and tangential strain signals; and
 determine one or both of traffic monitoring attributes and vehicle attributes based on the spatial-temporal strain measurements.

7. The system of claim 6, wherein:
 the traffic monitoring attributes comprise one or more of traffic volume, traffic speed, and road occupancy; and
 the vehicle attributes comprise one or more of number of axles, axle groups, vehicle type, and axle weight.

8. The system of claim 1, wherein the processor is configured to determine an axle group weight for vehicles moving along the pavement using the tangential strain signal.

9. The system of claim 1, wherein the processor is configured to determine an axle group weight for vehicles moving along the pavement using the lateral strain signal and the tangential strain signal.

10. The system of claim 1, wherein the processor is configured to:
 determine a location of each axle of each vehicle passing by the lateral fiber using the lateral strain signals obtained from optical sensors of the lateral fiber;
 determine, for each axle, a peak value of the lateral strain signals and one or more peak values of the longitudinal strain signals; and
 estimate a weight of each axle using the peak values of the lateral and longitudinal strain signals, a lateral equivalent stiffness estimation associated with the lateral fiber, and a longitudinal equivalent stiffness estimation associated with the at least one longitudinal fiber.

11. The system of claim 1, wherein the processor is configured to:
sum lateral strain measurements acquired using the optical sensors of the lateral fiber;
differentiate the lateral strain measurements with respect to time to identify timestamps of each axle of each vehicle passing by the lateral fiber;
pick peak values in the lateral strain measurements at corresponding timestamps to identify wheel locations;
pick peak values of mid-lateral strain signals acquired from a mid-lateral optical sensor of the lateral fiber between wheel locations;
pick peak values in the longitudinal strain signals acquired from optical sensors of the at least one longitudinal fiber; and
estimate a weight of each axle group using a subset of the tangential strain signals and mid-lateral strain signals, a lateral equivalent stiffness estimation associated with the lateral fiber, and a longitudinal equivalent stiffness estimation associated with the at least one longitudinal fiber.

12. A method, comprising:
receiving one or more lateral strain signals in the form of first wavelength shift signals from at least one lateral fiber comprising optical sensors coupled to a pavement in a transverse orientation relative to a direction of vehicle travel along the pavement;
receiving one or more longitudinal strain signals in the form of second wavelength shift signals from at least one longitudinal fiber comprising optical sensors coupled to the pavement in a longitudinal orientation relative to a direction of vehicle travel;
determining a weight of vehicles moving along the pavement based on the lateral and longitudinal strain signals; and
transmitting the weight of vehicles to a predetermined location.

13. The method of claim 12, wherein the at least one longitudinal fiber is positioned along a center of a lane of the pavement.

14. The method of claim 12, wherein the one or more longitudinal fibers comprises a plurality of longitudinal fibers and wherein the plurality of longitudinal fibers are positioned within a lane of the pavement.

15. The method of claim 12, wherein the at least one longitudinal fiber is positioned along a lane of the pavement at an angle relative to the direction of vehicle travel.

16. The method of claim 12, wherein at least one optical sensor of the lateral fiber is positioned on the pavement a predetermined distance from at least one optical sensor of the at least one longitudinal fiber.

17. The method of claim 12, comprising:
producing spatial-temporal strain measurements based on the lateral and tangential strain signals; and
determining one or both of traffic monitoring attributes and vehicle attributes based on the spatial-temporal strain measurements.

18. The method of claim 17, wherein:
the traffic monitoring attributes comprise one or more of traffic volume, traffic speed, and road occupancy; and
the vehicle attributes comprise one or more of number of axles, axle groups, vehicle type, and axle weight.

19. The method of claim 12, comprising determining an axle group weight for vehicles moving along the pavement using the tangential strain signal.

20. The method of claim 12, comprising determining an axle group weight for vehicles moving along the pavement using the lateral strain signal and the tangential strain signal.

21. The method of claim 12, comprising:
determining a location of each axle of each vehicle passing by the lateral fiber using the lateral strain signals obtained from optical sensors of the lateral fiber;
determining, for each axle, a peak value of the lateral strain signals and one or more peak values of the longitudinal strain signals; and
estimating a weight of each axle using the peak values of the lateral and longitudinal strain signals, a lateral equivalent stiffness estimation associated with the lateral fiber, and a longitudinal equivalent stiffness estimation associated with the at least one longitudinal fiber.

22. The method of claim 12, comprising:
summing lateral strain measurements acquired using the optical sensors of the lateral fiber;
differentiating the lateral strain measurements with respect to time to identify timestamps of each axle of a each vehicle passing by the lateral fiber; and
picking peak values in the lateral strain measurements at corresponding timestamps to identify wheel locations;
picking peak values of mid-lateral strain signals acquired from a mid-lateral optical sensor of the lateral fiber between wheel locations;
picking peak values of the longitudinal strain signals acquired from optical sensors of the at least one longitudinal fiber; and
estimating a weight of each axle group using a subset of the tangential strain signals and mid-lateral strain signals, a lateral equivalent stiffness estimation associated with the lateral fiber, and a longitudinal equivalent stiffness estimation associated with the at least one longitudinal fiber.

\* \* \* \* \*